(12) United States Patent
Gupta et al.

(10) Patent No.: US 10,407,563 B2
(45) Date of Patent: *Sep. 10, 2019

(54) PROCESSES FOR PRODUCING MOLDED ARTICLES STABILIZED AGAINST ULTRAVIOLET LIGHT AND THERMAL DEGRADATION

(71) Applicant: Cytec Industries Inc., Princeton, NJ (US)

(72) Inventors: Ram B. Gupta, Stamford, CT (US); Jerry Mon Hei Eng, Wilton, CT (US); Fadi Khawam, Mahwah, NJ (US); Ranjan Kumar Kamat, Smyrna, GA (US)

(73) Assignee: Cytec Industries Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,229

(22) Filed: Jun. 15, 2017

(65) Prior Publication Data

US 2017/0349730 A1    Dec. 7, 2017

Related U.S. Application Data

(63) Continuation of application No. 14/700,560, filed on Apr. 30, 2015, now Pat. No. 9,725,579.

(Continued)

(51) Int. Cl.
*C08K 5/527* (2006.01)
*C08K 5/3435* (2006.01)
(Continued)

(52) U.S. Cl.
CPC .............. *C08K 5/527* (2013.01); *C08K 3/01* (2018.01); *C08K 3/22* (2013.01); *C08K 3/26* (2013.01);
(Continued)

(58) Field of Classification Search
None
See application file for complete search history.

(56) References Cited

U.S. PATENT DOCUMENTS 4,985,479 A * 1/1991 Nagasaki ............. C08K 5/1345
524/103
5,214,084 A * 5/1993 Ishii ..................... C08K 3/0033
524/100

(Continued)

FOREIGN PATENT DOCUMENTS

CN    102010520 A    4/2011

OTHER PUBLICATIONS

International Search Report for International Patent Application No. PCT/US2015/028484, dated Jul. 24, 2015.

(Continued)

*Primary Examiner* — Joseph D Anthony
(74) *Attorney, Agent, or Firm* — Elizabeth A. Galletta; Charles E. Bell

(57) ABSTRACT

A process for producing a stabilized molded article including: combining a stabilizing amount of a thermal and ultraviolet (UV) light stabilizer composition with an organic material subject to degradation induced by light, heat or oxidation to form a stabilized organic material; and forming the stabilized organic material into a molded article, wherein the stabilizer composition comprises an ortho-hydroxyl trisaryl-s-triazine compound; a hindered amine light stabilizer compound; a hindered hydroxybenzoate compound; an acid scavenger; a phosphite compound; a hindered phenol antioxidant compound; and a thioester compound.

18 Claims, 2 Drawing Sheets

Related U.S. Application Data

(60) Provisional application No. 61/987,133, filed on May 1, 2014.

(51) Int. Cl.
*C08K 3/22* (2006.01)
*C08K 13/02* (2006.01)
*C08K 5/20* (2006.01)
*C08K 5/105* (2006.01)
*C08K 3/26* (2006.01)
*C09K 15/30* (2006.01)
*C08K 5/13* (2006.01)
*C08K 5/132* (2006.01)
*C08K 5/134* (2006.01)
*C08K 5/3462* (2006.01)
*C08K 5/3492* (2006.01)
*C08K 5/375* (2006.01)
*C08K 5/524* (2006.01)
*C08K 3/01* (2018.01)

(52) U.S. Cl.
CPC ............... *C08K 5/105* (2013.01); *C08K 5/13* (2013.01); *C08K 5/132* (2013.01); *C08K 5/1345* (2013.01); *C08K 5/20* (2013.01); *C08K 5/3435* (2013.01); *C08K 5/3462* (2013.01); *C08K 5/3492* (2013.01); *C08K 5/375* (2013.01); *C08K 5/524* (2013.01); *C08K 13/02* (2013.01); *C09K 15/30* (2013.01); *C08K 2003/222* (2013.01); *C08K 2003/2227* (2013.01)

(56) References Cited

U.S. PATENT DOCUMENTS

| | | | | |
|---|---|---|---|---|
| 6,051,164 | A * | 4/2000 | Samuels | C08K 5/34 252/403 |
| 6,727,300 | B2 * | 4/2004 | Sassi | C07D 211/46 524/103 |
| 6,843,939 | B2 * | 1/2005 | Stretanski et al. | C08K 5/1345 252/405 |
| 2005/0209379 | A1 * | 9/2005 | Botkin | C08K 5/13 524/115 |
| 2006/0111481 | A1 * | 5/2006 | Pearson | C08K 5/34 524/100 |
| 2006/0252857 | A1 * | 11/2006 | Schafer | C07D 251/22 524/100 |
| 2007/0105992 | A1 * | 5/2007 | Zahalka | C08K 5/524 524/115 |
| 2007/0197697 | A1 * | 8/2007 | Botkin | C08K 5/13 524/128 |
| 2009/0149581 | A1 * | 6/2009 | Zenner | C08K 5/13 524/100 |

OTHER PUBLICATIONS

Database WPI; Week 201151; Thomson Scientific, London, GB; AN 2011-F41249; XP002742183.

* cited by examiner

US 10,407,563 B2

PROCESSES FOR PRODUCING MOLDED ARTICLES STABILIZED AGAINST ULTRAVIOLET LIGHT AND THERMAL DEGRADATION

CROSS REFERENCE TO RELATED APPLICATION

The instant application claims priority benefit to U.S. patent application Ser. No. 14/700,560 entitled "Stabilizing Compositions for Stabilizing Materials Against Ultraviolet Light and Thermal Degradation" filed on Apr. 30, 2015, now issued as U.S. Pat. No. 9,725,579, which claims priority benefit to U.S. Provisional Patent Application No. 61/987,133 entitled "Stabilizer Compositions for Stabilizing Materials Against Ultraviolet Light and Thermal Degradation" filed on May 1, 2014, the entirety of both applications are incorporated herein by reference.

FIELD OF INVENTION

The instant invention relates to stabilizing compositions. In particular, the instant invention relates to compositions that stabilize materials against ultraviolet light degradation and thermal degradation.

BACKGROUND

Exposure to sunlight and other sources of ultraviolet (UV) radiation (also referred to as UV light) is known to cause degradation of a wide variety of materials. For example, polymeric materials such as plastics often discolor, lose gloss and/or become brittle as a result of prolonged exposure to UV light due primarily to a reduction in the molecular weight of the polymer. Accordingly, a large body of art has been developed directed towards compositions such as UV light absorbers and stabilizers, which are capable of inhibiting such degradation in polymeric articles.

Exposure to heat is also known to cause degradation of materials, especially polymeric materials. While compositions that reduce or prevent degradation caused by heat have been developed, combining these compositions with UV light stabilizer systems has not always yielded the desired result since the UV light stabilization properties are often hindered or completely relinquished (i.e., antagonistic) when combined with the heat stabilizer composition(s). Accordingly, there remains an unmet need in the market for a stabilizer composition that can protect materials from degradation due to both UV light and thermal exposure. This invention is believed to be an answer to the foregoing need.

SUMMARY

In one aspect, the invention is directed to thermal and ultraviolet (UV) light stabilizing compositions that include an ortho-hydroxyl tris-aryl-s-triazine compound; a hindered amine light stabilizer compound; a hindered hydroxybenzoate compound; an acid scavenger; a phosphite compound; and a hindered phenol antioxidant compound.

Another aspect of the invention is directed to thermal and ultraviolet (UV) light stabilizing compositions that include an ortho-hydroxyl tris-aryl-s-triazine compound; a hindered amine light stabilizer compound; a hindered hydroxybenzoate compound; a phosphite compound, and an acid scavenger or a thioester.

In another aspect, the invention is directed to stabilized compositions that include any of the thermal and UV light stabilizing compositions described herein and a material to be stabilized.

In a further aspect, the invention is directed to processes for preparing the aforementioned stabilized composition wherein the material to be stabilized is combined with any of the thermal and UV light stabilizing compositions described herein, thereby stabilizing the material against the degradative effects of exposure to heat and/or UV light.

In yet a further aspect, the invention is directed to a process for improving processability of a material selected from the group consisting of polyolefins, polyesters, polyethers, polyketones, polyamides, natural and synthetic rubbers, polyurethanes, polystyrenes, high-impact polystyrenes, polyacrylates, polymethacrylates, polyacetals, potyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyitnides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins, aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, radiation curable compositions, epoxytnelamine resins, organic dyes, cosmetic products, cellulose-based paper formulations, photographic film paper, fibers, waxes, inks, and blends thereof, the process comprising adding a stabilizing amount of a stabilizing composition as described herein to the material.

These and other aspects of the invention are described in more detail herein.

DETAILED DESCRIPTION

Figure 1A:
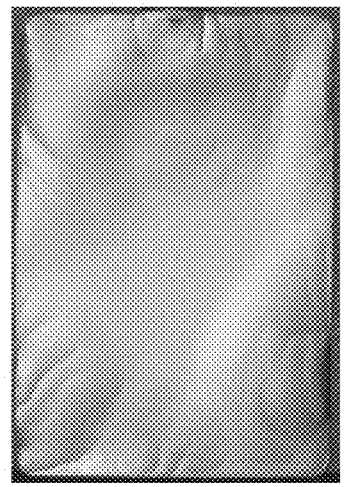
FIGS. 1A-1E are photographs (corresponding to Table 3, Examples 1C, 2C, 10, 13, and 14, respectively) showing percentage of gloss retention of plaques containing a thermoplastic olefin blended with or without light stabilizing compositions following exposure to extreme thermal conditions.

As summarized above, the compositions and processes using the same that have now been discovered and disclosed herein for the first time are surprisingly useful for achieving optimal stability against thermal and UV light degradation compared to current commercially available stabilizer packages. Furthermore, the processes and compositions disclosed herein additionally (and surprisingly) provide a stabilizer package that has a low release of volatile organic compounds (VOCs), low odor and low blooming as compared to current commercially available polymer stabilizer packages.

As employed above and throughout the disclosure, the following terms and definitions are provided to assist the reader. Unless otherwise defined, all terms of art, notations and other scientific terminology used herein are intended to have the meanings commonly understood by those of skill in the chemical arts. As used herein and in the appended claims, the singular forms include plural referents unless the context clearly dictates otherwise. Additionally, as used herein and in the appended claims, the disclosure of any ranges of amounts or concentrations includes the disclosure of any amount or value in the given range.

Throughout this specification the terms and substituents retain their definitions. A comprehensive list of abbreviations utilized by organic chemists (i.e. persons of ordinary skill in the art) appears in the first issue of each volume of the *Journal of Organic Chemistry*. The list, which is typically presented in a table entitled "Standard List of Abbreviations", is incorporated herein by reference.

The term "hydrocarbyl" is a generic term encompassing aliphatic, alicyclic and aromatic groups having an all-carbon backbone and consisting of carbon and hydrogen atoms. In certain cases, as defined herein, one or more of the carbon atoms making up the carbon backbone may be replaced or interrupted by a specified atom or group of atoms, such as by one or more heteroatom of N, O, and/or S. Examples of hydrocarbyl groups include alkyl, cycloalkyl, cycloalkenyl, carbocyclic aryl, alkenyl, alkynyl, alkylcycloalkyl, cycloalkylalkyl, cycloalkenylalkyl, and carbocyclic aralkyl, alkaryl, aralkenyl and aralkynyl groups. Such hydrocarbyl groups can also be optionally substituted by one or more substituents as defined herein. Accordingly, the chemical groups or moieties discussed in the specification and claims should be understood to include the substituted or unsubstituted forms. The examples and preferences expressed below also apply to each of the hydrocarbyl substituent groups or hydrocarbyl-containing substituent groups referred to in the various definitions of substituents for compounds of the formulas described herein unless the context indicates otherwise.

Preferred non-aromatic hydrocarbyl groups are saturated groups such as alkyl and cycloalkyl groups. Generally, and by way of example, the hydrocarbyl groups can have up to fifty carbon atoms, unless the context requires otherwise. Hydrocarbyl groups with from 1 to 30 carbon atoms are preferred. Within the sub-set of hydrocarbyl groups having 1 to 30 carbon atoms, particular examples are $C_{1-20}$ hydrocarbyl groups, such as $C_{1-12}$ hydrocarbyl groups (e.g. $C_{1-6}$ hydrocarbyl groups or $C_{1-4}$ hydrocarbyl groups), specific examples being any individual value or combination of values selected from $C_1$ through $C_{30}$ hydrocarbyl groups.

Alkyl is intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s- and t-butyl and the like. Preferred alkyl groups are those of $C_{30}$ or below.

Alkoxy or alkoxyalkyl refers to groups of from 1 to 20 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like.

Acyl refers to formyl and to groups of 1, 2, 3, 4, 5, 6, 7, 8, 9, 10, 11 and 12 carbon atoms of a straight, branched, cyclic configuration, saturated, unsaturated and aromatic and combinations thereof, attached to the parent structure through a carbonyl functionality. Examples include acetyl, benzoyl, propionyl, isobutyryl, t-butoxycarbonyl, benzyloxycarbonyl and the like, Lower-acyl refers to groups containing one to six carbons.

References to "carbocyclic" or "cycloalkyl" groups as used herein shall, unless the context indicates otherwise, include both aromatic and non-aromatic ring systems. Thus, for example, the term includes within its scope aromatic, non-aromatic, unsaturated, partially saturated and fully saturated carbocyclic ring systems. In general, such groups may be monocyclic or bicyclic and may contain, for example, 3 to 12 ring members, more usually 5 to 10 ring members. Examples of monocyclic groups are groups containing 3, 4, 5, 6, 7, and 8 ring members, more usually 3 to 7, and preferably 5 or 6 ring members. Examples of bicyclic groups are those containing 8, 9, 10, 11 and 12 ring members, and more usually 9 or 10 ring members. Examples of non-aromatic carbocycle/cycloalkyl groups include c-propyl, c-butyl, c-pentyl, c-hexyl, and the like. Examples of $C_7$ to $C_{10}$ polycyclic hydrocarbons include ring systems such as norbornyl and adamantyl.

Aryl (carbocyclic aryl) refers to a 5- or 6-membered aromatic carbocycle ring containing; a bicyclic 9- or 10-membered aromatic ring system; or a tricyclic 13- or 14-membered aromatic ring system. The aromatic 6- to 14-membered carbocyclic rings include, e.g., substituted or unsubstituted phenyl groups, benzene, naphthalene, indane, tetralin, and fluorene.

Substituted hydrocarbyl, alkyl, aryl, cycloalkyl, alkoxy, etc. refer to the specific substituent wherein up to three H atoms in each residue are replaced with alkyl, halogen, haloalkyl, hydroxy, alkoxy, carboxy, carboalkoxy (also referred to as alkoxycarbonyl), carboxamide (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, halobenzyl, heteroaryl, phenoxy, benzyloxy, heteroaryloxy, benzoyl, halobenzoyl, or lower alkylhydroxy.

As summarized above, this invention relates to a thermal and ultraviolet (UV) light stabilizing composition that includes an ortho-hydroxyl tris-aryl-s-triazine compound, a hindered amine light stabilizer (HALS) compound, a hindered hydroxybenzoate compound, a phosphite compound, an acid scavenger and a hindered phenol antioxidant compound. In another embodiment, the thermal and UV light stabilizing composition also includes, in addition to the foregoing compounds, a thioester compound.

Preferably, the ortho-hydroxy tris-aryl-s-triazine compound is 2-(2'-hydroxyphenyl)-1,3,5-triazine compound according to Formula (I):

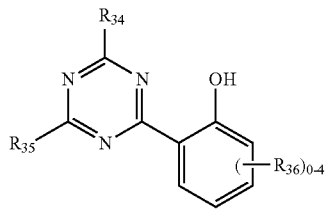

Formula (I)

wherein each of $R_{34}$ and $R_{35}$ in Formula (I) is independently chosen from $C_6$-$C_{10}$ aryl optionally substituted, $C_1$-$C_{10}$ hydrocarbyl-substituted amino, $C_1$-$C_{10}$ acyl or $C_1$-$C_{10}$ alkoxyl; and wherein $R_{36}$ in Formula (I) is present at from 0 to 4 positions of the phenoxy portion of Formula I and each instance is independently chosen from hydroxyl, $C_1$-$C_{12}$ hydrocarbyl, $C_1$-$C_{12}$ alkoxyl, $C_1$-$C_{12}$ alkoxyester, or $C_1$-$C_{12}$ acyl.

Examples of the 2-(2'-hydroxyphenyl)-1,3,5-triazine include 4,6-bis-(2,4-dimethylphenyl)-2-(2-hydroxy-4-octyloxyphenyl)-s-triazine; 4,6-bis-(2,4-dimethylphenyl)-2-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxy-ethoxy)phenyl]-6-(4-chlorophenyl)-s-triazine; 2,4-bis[2-hydroxy-4-(2-hydroxy-4-(2-hydroxy-ethoxy)phenyl]-6-(2,4-dimethylphenyl)-s-triazine; 2,4-bis[2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chlorophenyl)-s-triazine; 2,4-bis(2,4-dihydroxyphenyl)-6-(2,4-dimethylphenyl)-s-triazine; 2,4-bis(4-biphenylyl)-6-[2-hydroxy-4-[(octyloxycarbonyl)ethylideneoxy]phenyl]-s-triazine, 2,4-bis(4-biphenylyl)-6-[2-hydroxy-4-(2-ethylhexyloxy)phenyl]-s-triazine; 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine; 2,4-bis(2,4-dimethylphenyl)-6-[2-hydroxy-4(-3-benzyloxy-2-hydroxypropyloxy)phenyl]-s-triazine; 2,4-bis(2-hydroxy-4-n-butyloxyphenyl)-6-(2,4-di-n-butyloxyphenyl)-s-triazine; 2,4-bis(2,4-dimethylphenyl)-6-[2-hydroxy-4-(3-nonyloxy-2-hydroxypropyloxy)-5-α-cumylphenyl]-s-triazine; methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio; 2,4,6-tris(2-hydroxy-4-isooctyloxycarbonyliso-propylideneoxy-phenyl)-s-triazine, 2,4-bis(2,4-dimethylphenyl)-6-(2-hydroxy-4-hexyloxy-5-α-cumylphenyl)-s-triazine; 2-(2,4,6-trimethylphenyl)-4,6-bis[2-hydroxy-4-(3-butyloxy-2-hydroxypropyloxy)phenyl]-s-triazine; 2,4,6-tris[2-hydroxy-4-(3-sec-butyloxy-2-hydroxypropyloxy)-phenyl]-s-triazine; mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine; 4,6-bis-(2,4-dimethylphenyl)-2-(2-hydroxy-4(3-(2-ethylhexyloxy)-2-hydroxypropoxy)-phenyl)-s-triazine; 4,6-diphenyl-2-(4-hexyloxy-2-hydroxyphenyl)-s-triazine; 2-(4,6-Diphenyl-1,3,5-triazin-2-yl)-5-[2-(2-ethylhexanoyloxy)ethoxy]phenol; 2,4,6-tris(2-hydroxy-4-octyloxyphenyl)-1,3,5-triazine; propanoic acid, 2,2',2"-[1,3,5-triazine-2,4,6-triyltris[(3-hydroxy-4,1-phenylene)oxy]]tris-1,1',1"-trioctyl ester; propanoic acid, 2-[4-[4,6-bis([1,1'-biphenyl]-4-yl)-1,3,5-triazin-2yl]-3-hydroxyphenoxyl]-isooctyl ester; and combinations thereof.

The HALS compound includes a molecular fragment according to (i) Formula (II):

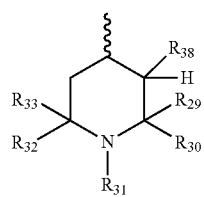

Formula (II)

wherein $R_{31}$ in Formula (II) is chosen from: hydrogen; OH; $C_1$-$C_{20}$ hydrocarbyl; —$CH_2CN$; $C_1$-$C_{12}$ acyl; or $C_1$-$C_{18}$ alkoxy; $R_{38}$ in Formula (II) is chosen from: hydrogen; or $C_1$-$C_8$ hydrocarbyl; and each of $R_{29}$, $R_{30}$, $R_{32}$, and $R_{33}$ in Formula (II) is independently chosen from $C_1$-$C_{20}$ hydrocarbyl, or $R_{29}$ and $R_{30}$ and/or $R_{32}$ and $R_{33}$ in Formula (II) taken together with the carbon to which they are attached form a $C_5$-$C_{10}$ cycloalkyl; or (ii) Formula (IIa)

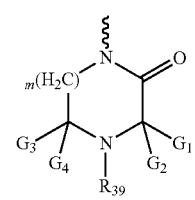

Formula (IIa)

wherein in in Formula (IIa) is an integer from 1 to 2; $R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and each of $G_1$-$G_4$ in Formula (IIa) is independently chosen from $C_1$-$C_{20}$ hydrocarbyl.

Examples of the HALS compound include bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of N,N'-bis(2,2,6,6-tetramethylpiperidin-4-yl)hexamethylenediamine and 4-morpholine-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8- diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl)butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol, 1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperdinol with higher fatty acids; 3-dodecyl-1-(2,2,6,6-tetramethyl-4-piperidyl)pyrrolidine-2,5-dione; 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1''-[1,3,5-triazine-2,4,6-triyltris[(cyclohexylimino)-2,1-ethanediyl]]tris[3,3,5,5-tetramethyl-; piperazinone, 1,1',1''-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxyllic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate, mixture of 2,2,4,4-tetramethyl-21-oxo-7-oxa-3,20-diazaspiro(5.1.11.2)-heneicosane-20-propanoic acid-dodecylester and 2,2,4,4-tetramethyl-21-oxo-7-oxa-3,20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxatnide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine, ethane diamide, N-(1-acetyl-2,2,6,6-tetramethylpiperidinyl)-N'-dodecyl, formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-, 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione, 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl)3,3-pentamethylene-5,5-dimethylpiperazin-2-one; $N^1$-tert-octyl-3,3,5,5-tetramethyl-diazepin-2-one; $N^1$-tert-octyl-3,3- pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone); trans-1,2-cyclohexane-bis-($N^1$-3,3,5,5-dispiropentamethylene-2-piperazinone); $N^1$-isopropyl-1,4-diazadispiro-(3,3,5,5)pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentarnethylene-1,4-diazepin-2-one; $N^1$-octyl-1,4-diazadispiro-(3,3,5,5)pentamethylene-1,5-diazepin-2-one; and mixtures thereof.

The hindered hydroxybenzoate compound is a compound according to Formula (III):

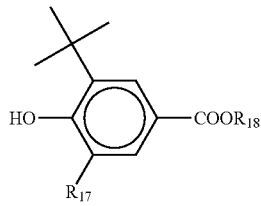

Formula (III)

wherein $R_{17}$ in Formula (III) is a $C_1$-$C_8$ alkyl and $R_{18}$ in Formula (III) is a $C_1$-$C_{24}$ alkyl or substituted or unsubstituted $C_6$-$C_{24}$ aryl. In particular, the hindered hydroxybenzoate compound is 2,4-di-tert-butylphenyl 3,5-di-tert-butyl-4-hydroxybenzoate; hexadecyl 3,5-di-test-butyl-4-hydroxybenzoate; octadecyl 3,5-di-tert-butyl-4-hydroxybenzoate; octyl 3,5-di-tert-butyl-4-hydroxybenzoate; tetradecyl 3,5-di-tert-butyl-4-hydroxybenzoate; behenylyl 3,5-di-tert-butyl-4-hydroxybenzoate; 2-methyl-4,6-di-tert-butylphenyl 3,5-di-tert-butyl-4-hydroxybenzoate or butyl 3-[3-t-butyl-4-(3,5-di-t-butyl-4-hydroxybenzoyloxy)phenyl]propionate.

The acid scavenger used in the thermal and UV light stabilizing composition may include one or more of the following compounds: zinc oxide, calcium lactate, natural and synthetic hydrotalcites, natural and synthetic hydrocalutnites, alkali metal salts and alkaline earth metal salts of higher fatty acids, calcium stearate, zinc stearate, magnesium behenate, magnesium stearate, sodium stearate, sodium ricinoleate and potassium palmitate, antimony pyrocatecholate, zinc pyrocatecholate. In one example, the acid scavenger includes magnesium oxide, aluminum oxide, magnesium hydroxide, aluminum hydroxide, carbonates thereof or mixtures thereof. A specific example of an acid scavenger includes DHT-4A (CAS No. 11097-59-9), a magnesium aluminum hydroxide carbonate hydrate that is a synthetic hydrotalcite compound.

The hindered phenol antioxidant compound includes a molecular fragment according to one or more of Formula (IVa), (IVb), or (IVc):

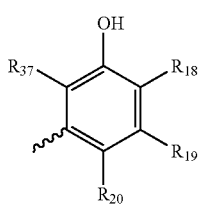

Formula (IVa)

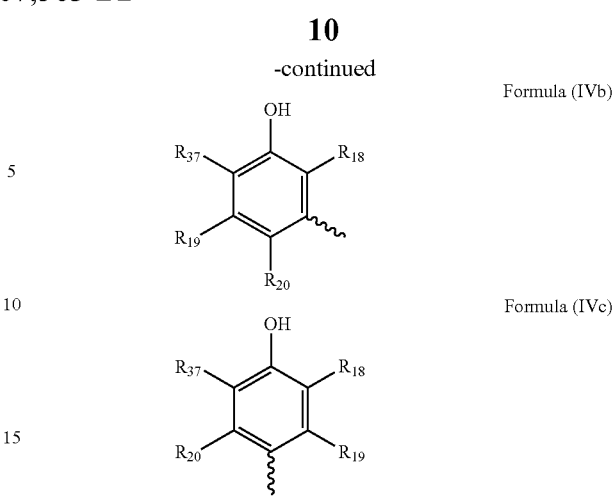

Formula (IVb)

Formula (IVc)

wherein $R_{18}$ in Formulae (IVa), (IVb) and (IVc) is chosen from hydrogen or a $C_{1-4}$ hydrocarbyl; each of $R_{19}$ and $R_{20}$ in Formulae (IVa), (IVb) and (IVc) is independently chosen from hydrogen or a $C_1$-$C_{20}$ hydrocarbyl; and $R_{37}$ in Formulae (IVa), (IVb) and (IVc) is chosen from $C_1$-$C_{12}$ hydrocarbyl. In one embodiment, $R_{18}$ in Formulae (IVa), (IVb) and (IVc) and $R_{37}$ are chosen from methyl or t-butyl. Examples of the hindered phenol antioxidant compound include (1,3,5-Tris(4-t-butyl-3-hydroxy-2,6-dimethylbenzyl)-1,3,5-triazine-2,4,6-(1H,3H,5H)-trione; 1,3,5-tris(3,5-di-tert-butyl-4-hydroxybenzyl)-1,3,5-triazine-2,4,6(1H,3H,5H)-trione; 1,1,3-Tris(2'-methyl-4'-hydroxy-5'-t-butylphenyl)butane; Triethylene glycol bis[3-(3-t-butyl-4-hydroxy-5-methylphenyl)propionate]; 4,4'-Thiobis(2-t-butyl-5-methylphenol); 2,2'-Thiodiethylene bis[3-(3-t-butyl-4-hydroxyl-5-methylphenyl)propionate]; Octadecyl 3-(3'-t-butyl-4'-hydroxy-5'-methylphenyl)propionate; Tetrakismethylene(3-t-butyl-4-hydroxy-5-methylhydrocinnamate)methane; N,N'-Hexamethylene bis[3-(3-t-butyl-4-hydroxy-5-methylphenyl)propionamide]; Di(4-tertiarybutyl-3-hydroxy-2,6-dimethyl benzyl) thiodipropionate; and octadecyl 3,5-di-(tert)-butyl-4-hydroxyhydrocinnamate.

The phosphite used in the thermal and UV light stabilizing composition may be a hindered arylalkyl phosphite or a trisarylphosphite, or mixtures thereof. The hindered arylalkyl phosphite is a compound according to Formula (V):

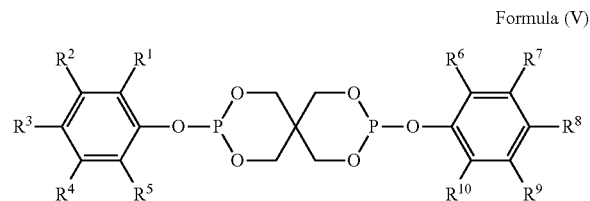

Formula (V)

wherein each of $R^1$, $R^2$, $R^3$, $R^4$, $R^5$, $R^6$, $R^7$, $R^8$, $R^9$, and $R^{10}$ in Formula (V) is independently chosen from hydrogen, $C_1$-$C_{12}$, alkyl, $C_3$-$C_{12}$ cycloalkyl, $C_4$-$C_{12}$ alkyl cycloalkyl, $C_6$-$C_{10}$ aryl, or $C_7$-$C_{12}$ alkylaryl, wherein $R^1$ and $R^5$ together comprise at least 5 carbons and at least one of $R^1$ and $R^5$ comprises a tertiary carbon, wherein $R^6$ and $R^{10}$ together comprise at least 5 carbons and at least one of $R^6$ and $R^{10}$ comprises a tertiary carbon. Examples of the hindered arylalkyl phosphite include: bis-(2,6-di-t-butyl-4-methlphenyl)pentaerythritol diphosphite, (bis-(2,4-dicumylphenyl)

pentaerythritol diphosphite, bis-(2,4-di-t-butyl-phenyl)pentaerythritol diphosphite, and bis-(2,4,6-tri-t-butyl-phenyl) pentaerythritol diphosphate.

The trisarylphosphite is a compound according to Formula (VI):

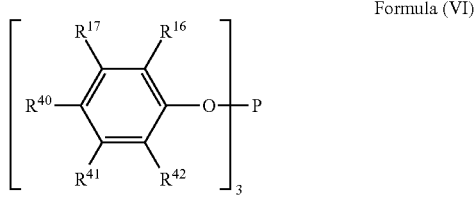

Formula (VI)

wherein each of $R^{16}$, $R^{17}$, $R^{40}$, $R^{41}$, and $R^{42}$ in Formula (VI) is independently chosen from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, or $C_7$-$C_{20}$ alkylaryl. Examples of the trisarylphosphite include: tris-(2,4-di-t-butylphenyl)phosphite, tris(4-nonylphenyl) phosphite and triphenyl phosphite.

The thioester compound is chosen from dilauryl thiodipropionate, distearyl thiodipropionate, pentaerythrithol tetrakis-(3-dodecylthipropionate), tetra-alkyl thioethyl thiodisuccinate, 2,12-dihydroxy-4,10-dithia-7-oxatridecamethylene bis[3-(dodecylthio)propionate], polyalkanol esters of alkylthio-alkanoic acids, or dialkyl 3,3'-thiodipropionate.

In one formulation of the thermal and UV light stabilizing composition, the composition includes between about 1.00 wt. % to about 10.00 wt. % (preferably about 2.00 wt. % to about 6.00 wt %) of the ortho-hydroxyl tris-aryl-s-triazine compound, between about 20.00 wt. % to about 50.00 wt. % (preferably about 25.00 wt. % to about 35.00 wt. %) of the hindered amine light stabilizer compound, between about 20.00 wt. % to about 50.00 wt. % (preferably about 25.00 wt. % to about 35.00 wt. %) of the hindered hydroxybenzoate compound, between 1 wt. % to about 10 wt. % (preferably about 2.0 wt. % to about 8.0 wt. %) of the acid scavenger, between about 1 wt. % to about 10 wt. % (preferably about 2.00 wt. % to about 6.00 wt. %) of the hindered phenol antioxidant compound, and between about 5.00 wt. % to about 40.00 wt. % (preferably about 20.00 wt. % to about 30.00 wt. %) of the phosphite compound where the wt. % of each component is based on the total weight of the thermal and UV light stabilizing composition.

In another embodiment, a formulation of the thermal and UV light stabilizing composition includes between about 1.00 wt. % to about 10.00 wt. % (preferably about 2.00 wt. % to about 6.00 wt. %) of the ortho-hydroxyl tris-aryl-s-triazine compound, between about 20.00 wt. % to about 50.00 wt. % (preferably about 30.00 wt. % to about 40.00 wt. %) of the hindered amine light stabilizer compound, between about 20.00 wt. % to about 50.00 wt % (preferably about 30.00 wt. % to about 40.00 wt. %) of the hindered hydroxybenzoate compound, between 1 wt. % to about 10 wt. % (preferably about 2.00 wt. % to about 8.00 wt. %) of the acid scavenger, between about 1 wt. % to about 10 wt. % (preferably about 2.00 wt. % to about 6.00 wt. %) of the hindered phenol antioxidant compound, between about 5.00 wt. % to about 25.00 wt. % (preferably about 6.00 wt. % to about 12.00 wt. %) of the phosphite compound, and between about 1.00 wt. % to about 15.00 (preferably about 5.00 wt % to 10.00 wt. %) of the thioester compound, where the wt. % of each component is based on the total weight of the thermal and UV light stabilizing composition.

In a particular embodiment, a formulation of the thermal and UV light stabilizing composition includes about 4 wt. % of the ortho-hydroxyl tris-aryl-s-triazine compound, about 34 wt. % of the hindered amine light stabilizer compound, about 34 wt. % of the hindered hydroxybenzoate compound, about 7 wt. % of the acid scavenger, about 4 wt. % of the hindered phenol antioxidant compound, about 10 wt. % of the phosphite compound and about 7 wt. % of the thioester compound, where the wt. % of each component is based on the total weight of the thermal and UV light stabilizing composition.

In another particular embodiment, a formulation of the thermal and UV light stabilizing composition includes about 4 wt. % of the ortho-hydroxyl tris-aryl-s-triazine compound, about 30 wt. % of the hindered amine light stabilizer compound, about 30. wt. % of the hindered hydroxybenzoate compound, about 7 wt. % of the acid scavenger, about 4 wt. % of the hindered phenol antioxidant compound, and about 25 wt. % of the phosphite compound, where the wt. % of each component is based on the total weight of the thermal and UV light stabilizing composition.

The thermal and UV light stabilizing composition can be combined with a material to be stabilized, e.g., a polymer, in any manner known in the art, thus forming a composition that is a stabilized material (also referred to herein as a stabilized composition or a composition). Materials to be stabilized, to which the thermal and UV light stabilizing composition may be combined with, include, but are not limited to, polymers such as polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins, atninoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketitnines in combination with unsaturated acrylic resins, radiation curable compositions, epoxymelamine resins, as well as organic dyes, cosmetic products, cellulose-based paper formulations, photographic film paper, fibers, waxes, inks, and blends thereof.

Preferably, the material to be stabilized is a polymer, such as thermoplastic olefins, acrylonitrile-butadiene-styrene, polyesters, polyvinylchloride, polyamides, polyurethanes, or homo- and copolymers of propylene, isobutylene, butene, methylpentene, hexene, heptene, octene, isoprene, butadiene, hexadiene, dicyclopentadiene, ethylidene, cyclopentene and norbornene. More preferably, the material to be stabilized is polypropylene and thermoplastic olefins.

In one embodiment, it is contemplated that the material to be stabilized may be formed or molded into a material or item used in the construction or renovation of buildings, e.g., homes, offices, warehouses, and the like. For example, the material to be stabilized may be formed into vinyl siding, vinyl siding trim, shutters, gable vents, eaves, fascia, soffits, moldings, roofing shingles, roofing underlayment or base sheets, roofing membranes, batten systems, batten extenders, flashing, tile pans, ridge vents, weather blocks, hip and ridge systems (also known as hip and ridge shingles), cave risers, taper strips, gable end wedges, rake trim, geomembranes, composite deck materials, railings, window frames, and other materials and items used in the construction or renovation of buildings.

In one embodiment, the material to be stabilized, and thermal and UV light stabilizing composition are combined to form a "master batch" composition. In one embodiment, the master batch composition includes between 10 wt. % to about 80 wt. % of the thermal and UV light stabilizing compound, based on the total weight of the master batch composition, with the remainder being the material to be stabilized. In a more preferred embodiment, the master batch composition includes between 30 wt. % to about 60 wt. % of the thermal and UV light stabilizing composition, based on the total weight of the master batch composition, with the remainder being the material to be stabilized. In another embodiment, the master batch composition includes between 40 wt. % to about 50 wt. % of the thermal and UV light stabilizing composition, based on the total weight of the master batch composition, with the remainder being the material to be stabilized.

One embodiment includes a master batch concentrate comprising a stabilizing composition according to any of the embodiments described herein and at least one organic material identical or compatible with a material to be stabilized, wherein the stabilizing composition is present in an amount from 10 wt. % to 90 wt. % based on the total weight of the master batch concentrate.

In certain embodiments, the amount of thermal and UV stabilizing composition as described herein in the stabilized composition for end-use is present at any point in the range from 0.01 wt. % to 5 wt. %, based on the total weight of the material to be stabilized. In a particular embodiment, the amount of thermal and UV stabilizing composition in the stabilized composition for end-use is present at any point in the range from 0.05 wt. % to 2 wt. %, based on the total weight of the material to be stabilized.

The specific components of the thermal and UV stabilizing composition as described herein can be present in the stabilized composition in various amounts depending on the material to be stabilized and/or the level of desired protection. For example, the amount of the ortho-hydroxyl tris-aryl-s-triazine compound in the stabilized composition for end-use can range from about 0.002 wt. % to about 0.50 wt. %, preferably 0.004 wt. % to about 0.20 wt. %, more preferably 0.005 wt. % to about 0.1 wt. % based on the total weight of stabilized composition.

The amount of the hindered amine light stabilizer compound in the stabilized composition is from about 0.01 wt. % to about 1.20 wt. %, preferably from about 0.02 wt. % to about 0.80 wt. %, more preferably from about 0.03 wt. % to about 0.62 wt. %, based on the total weight of the stabilized composition.

The amount of the hindered hydroxybenzoate compound in the stabilized composition is from about 0.01 wt. % to about 1.20 wt. %, preferably from about 0.02 wt. % to about 0.80 wt. %, more preferably from about 0.03 wt. % to about 0.62 wt. %, based on the total weight of the stabilized composition.

The amount of the acid scavenger in the stabilized composition is from about 0.001 wt. % to about 0.50 wt. %, preferably from about 0.003 wt. % to about 0.25 wt. %, more preferably from 0.006 wt. % to about 0.14 wt. %, based on the total weight of the stabilized composition.

The amount of the hindered phenol antioxidant compound in the stabilized composition is from about 0.001 wt. % to about 0.50 wt. %, preferably from about 0.002 wt. % to about 0.25 wt. %, more preferably from about 0.004 wt. % to about 0.085 wt. %, based on the total weight of the stabilized composition.

The amount of the phosphite compound in the stabilized composition is from about 0.005 wt. % to about 1.00 wt. %, preferably from about 0.01 wt. % to about 0.80 wt. %, more preferably from about 0.02 wt. % to about 0.5 wt. %, based on the total weight of the stabilized composition.

The amount of the thioester compound in the stabilized composition is from about 0.001 wt. % to about 0.80 wt. %, preferably from about 0.003 wt. % to about 0.4 wt. %, more preferably from about 0.006 wt. % to about 0.2 wt. %, based on the total weight of the stabilized composition.

This application also contemplates a method of preparing the composition above by combining the thermal and UV light stabilizing composition with the material to be stabilized. The term "combining" or "combined" is intended to include all manners in which the thermal and UV light stabilizing compositions can be combined, and includes, for example, intermixing, admixing, integrating, mixing, blending, and the like. Additionally, it is noted that the thermal and UV light stabilizing composition and the material to be stabilized may be combined in any order, i.e., the thermal and UV light stabilizing composition can be added to the material to be stabilized, or vice versa, or the thermal and UV light stabilizing composition and the material to be stabilized can be simultaneously added to a vessel.

The material to be stabilized and the thermal and UV light stabilizing composition can be combined by blending or compounding the components in a kneading apparatus such as a single or twin screw extruder, Banbury mixer, or hot rollers. The processing parameters and the use of such kneading apparatus are well known to those skilled in the art.

As would be apparent to those skilled in the art of making plastic materials, in addition to the material to be stabilized and the thermal and UV light stabilizing composition, the composition of the present invention may also include conventional additives including, but not limited to, metal deactivators, nitrones, lactones, co-stabilizers, nucleating agents, clarifying agents, neutralizers, metallic stearates, metal oxides, hydrotalcites, fillers and reinforcing agents, plasticizers, lubricants, emulsifiers, pigments, rheological additives, catalysts, level agents, optical brighteners, flame retardant agents, anti-static agents and blowing agents.

The invention includes at least the following embodiments:

Embodiment 1

A thermal and ultraviolet (UV) light stabilizing composition comprising:
an ortho-hydroxyl tris-aryl-s-triazine compound;
a hindered amine light stabilizer compound;
a hindered hydroxybenzoate compound;

an acid scavenger;
a phosphite compound; and
a hindered phenol antioxidant compound.

Embodiment 2

The thermal and UV light stabilizing composition according to embodiment 1, further comprising a thioester compound.

Embodiment 3

The thermal and UV light stabilizing composition according to any one of the preceding embodiments, wherein the ortho-hydroxyl tris-aryl-s-triazine compound is a 2-(2'-hydroxyphenyl)-1,3,5-triazine compound according to Formula (I):

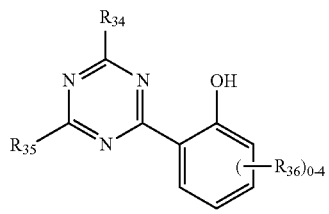

Formula (I)

wherein each of $R_{34}$ and $R_{35}$ in Formula (I) is independently chosen from $C_6$-$C_{10}$ aryl optionally substituted, $C_1$-$C_{10}$ hydrocarbyl-substituted amino, $C_1$-$C_{10}$ acyl or $C_1$-$C_{10}$ alkoxyl; and wherein $R_{36}$ in Formula (I) is present at from 0 to 4 positions of the phenoxy portion of Formula I and in each instance is independently chosen from hydroxyl, $C_1$-$C_{12}$ hydrocarbyl, $C_1$-$C_{12}$ alkoxyl, $C_1$-$C_{12}$ alkoxyester, or $C_1$-$C_{12}$ acyl.

Embodiment 4

The thermal and UV light stabilizing composition according to embodiment 3, wherein the 2-(2'-hydroxyphenyl)-1,3,5-triazine compound is selected from the group consisting of: 4,6-bis-(2,4-dimethylphenyl)-2-(2-hydroxy-4-octyloxy-phenyl)-s-triazine; 4,6-bis-(2,4-dimethylphenyl)-2-(2,4-di-hydroxyphenyl)-s-triazine; 2,4-bis(2,4-dihydroxyphenyl)-6-(4-chlorophenyl)-s-triazine; 2,4-bis[2-hydroxy-4-(2-hydroxy-ethoxy)phenyl]-6-(4-chlorophenyl)-s-triazine; 2,4-bis[2-hydroxy-4-(2-hydroxy-4-(2-hydroxy-ethoxy)phenyl]-6-(2,4-dimethylphenyl)-s-triazine; 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine; 2,4-bis(2,4-dihydroxyphenyl)-6-(2,4-dimethylphenyl)-s-triazine, 2,4-bis(4-biphenylyl)-6-[2-hydroxy-4-[(octyloxycarbonyl)ethylideneoxy]phenyl]-s-triazine; 2,4-bis(4-biphenylyl)-6-[2-hydroxy-4-(2-ethylhexyloxy)phenyl]-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4(-3-benzyloxy-2-hydroxypropyloxy)phenyl]-s-triazine; 2,4-bis(2-hydroxy-4-n-butyloxyphenyl)-6-(2,4-di-n-butyloxyphenyl)-s-triazine; 2,4-bis(2,4-dimethylphenyl)-6-[2-hydroxy-4-(3-nonyloxy-2-hydroxypropylox-y)-5-α-cumylphenyl]-s-triazine; methylenebis-{2,4-bis(2,4-dimethylphenyl)-6-[2-hydroxy-4-(3-butyloxy-2-hydroxypropoxy)phenyl]-s-triazine}; methylene bridged dimer mixture bridged in the 3:5', 5:5' and 3:3' positions in a 5:4:1 ratio; 2,4,6-tris(2-hydroxy-4-isooctyloxycarbo-nyliso-propylideneoxy-phenyl)-s-triazine, 2,4-bis(2,4-dimethylphenyl)-6-(2-hydroxy-4-hexyloxy-5-α-cumylphenyl)-s-triazine; 2-(2,4,6-trimethyllphenyl)-4,6-bis[2-hydroxy-4-(3-butyloxy-2-hydroxypropyloxy)phenyl]-s-triazine; 2,4,6-tris[2-hydroxy-4-(3-sec-butyloxy-2-hydroxypropyloxy)-phenyl]-s-triazine; mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine; 4,6-bis-(2,4-dimethylphenyl)-2-(2-hydroxy-4(3-(2-ethylhexyloxy)-2-hydroxypropoxy)-phenyl)-s-triazine; 4,6-diphenyl-2-(4-hexyloxy-2-hydroxyphenyl)-s-triazine; 2-(4, 6-Diphenyl-1,3,5-triazin-2-yl)-5-[2-(2-ethylhexanoyloxy) ethoxy]phenol; 2,4,6-tris(2-hydroxy-4-octyloxyphenyl)-1,3, 5-triazine; propanoic acid, 2,2',2''-[1,3,5-triazine-2,4,6-triyltris[(3-hydroxy-4,1-phenylene)oxy]]tris-1,1',1''-trioctyl ester; propanoic acid, 2-[4-[4,6-bis([1,1'-biphenyl]-4-yl)-1, 3,5-triazin-2yl]-3-hydroxyphenoxyl]-isooctyl ester; and combinations thereof.

Embodiment 5

The thermal and UV light stabilizing composition according to any one of the preceding embodiments, wherein the hindered amine light stabilizer compound comprises a molecular fragment according to (i) Formula (II):

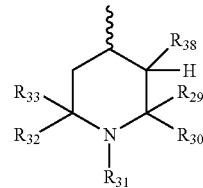

Formula (II)

wherein
$R_{31}$ in Formula chosen from: hydrogen; OH; $C_1$-$C_{20}$ hydrocarbyl; —$CH_2CN$; $C_1$-$C_{12}$ acyl; or $C_1$-$C_{18}$ alkoxy;
$R_{38}$ in Formula (II) is chosen from: hydrogen; or $C_1$-$C_8$ hydrocarbyl; and
each of $R_{29}$, $R_{30}$, $R_{32}$, and $R_{33}$ in Formula (II) is independently chosen from $C_1$-$C_{20}$ hydrocarbyl, or $R_{29}$ and $R_{30}$ and/or $R_{32}$ and $R_{33}$ in Formula (II) taken together with the carbon to which they are attached form a $C_5$-$C_{10}$ cycloalkyl;
or (ii) Formula (IIa)

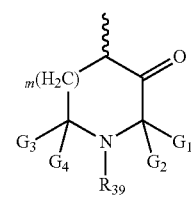

Formula (IIa)

wherein m in Formula (IIa) is an integer from 1 to 2; $R_{39}$ in Formula (IIa) is chosen from: hydrogen; OH; $C_1$-$C_{20}$ hydrocarbyl; —$CH_2CN$; $C_1$-$C_{12}$ acyl; or $C_1$-$C_{18}$ alkoxy; and each of $G_1$-$G_4$ in Formula (IIa) is independently chosen from $C_1$-$C_{20}$ hydrocarbyl.

Embodiment 6

The thermal and UV light stabilizing composition according to any one of the preceding embodiments, wherein the hindered amine light stabilizer is selected from the group consisting of: bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of N,N'-bis(2,2,6,6-tetramethylpiperidin-4-yl)hexamethylenediamine and 4-morpholino-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a condensate of N,N'-bis(2,2,6,6-tetramethylpiperidin-4-yl)hexamethylenediamine and 4-cyclohexylamino-2,6-dichloro-1,3,5-triazine, a condensate of 1,2-bis(3-aminopropylamino)ethane, 2,4,6-trichloro-1,3,5-triazine and 4-butylatnino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl) butane-1,2,3,4-tetracarboxylate, 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol, 1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethyl-piperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one, the ester of 2,2,6,6-tetramethyl-4-piperidinol with higher fatty acids; 3-dodecyl-1-(2,2,6,6-tetramethyl-4-piperidyl)pyrrolidine-2,5-dione, 1H-Pyrrole-2,5-dione, 1-octadecyl-, polymer with (1-methylethenypbenzene and 1-(2,2,6,6-tetramethyl-4-piperidinyl)-1H-pyrrole-2,5-dione; piperazinone, 1,1',1''-[1,3,5-triazine-2,4,6-triyltris[(cyclohexylimino)-2,1-ethanediyl]]tris[3,3,5,5-tetramethyl-, piperazinone, 1,1',1''-[1,3,5-triazine, 2,4,6-triyltris[(cyclohexylimino)-2,1-ethanediyl]]tris[3,3,4,5,5-pentamethyl-, the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl, 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); N$^1$-(β-hydroxyethyl)3,3-pentamethylene-5,5-dimethylpiperazin-2-one; N$^1$-tert-octyl-3,3,5,5-tetramethyl-diazepin-2-one; N$^1$-tert-octyl-3,3-pentamethylene-5,5-hexamethylene-diazepin-2-one; N$^1$-tert-octyl-3,3-pentamethylene-5,5-dimethylpiperazin-2-one; trans-1,2-cyclohexane-bis-(N$^1$-5,5-dimethyl-3,3-pentamethylene-2-piperazinone; trans-1,2-cyclohexane-bis-N$^1$-3,3,5,5-dispiropentamethylene-2-piperazinone); N$^1$-isopropyl-1,4-diazadispiro-(3,3,5,5)pentamethylene-2-piperazinone; N$^1$-isopropyl-1,4-diazadispiro-3,3-pentamethylene-5,5-tetramethylene-2-piperazinone; N$^1$-isopropyl-5,5-dimethyl-3,3-pentamethylene-2-piperazinone; trans-1,2-cyclohexane-bis-N$^1$-(dimethyl-3,3-pentamethylene-2-piperazinone); N$^1$-octyl-5,5-dimethyl-3,3-pentamethylene-1,4-diazepin-2-one; N$^1$-octyl-1,4-diazadispiro-(3,3,5,5)pentamethylene-1,5-diazepin-2-one; and mixtures thereof.

Embodiment 7

The thermal and UV light stabilizing composition according to any one of the preceding embodiments, wherein the hindered hydroxybenzoate compound is according to Formula (III):

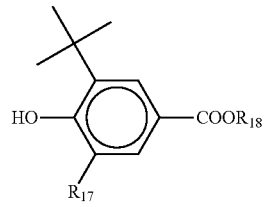

Formula (III)

wherein $R_{17}$ in Formula (III) is a $C_1$-$C_8$ alkyl and $R_{18}$ in Formula (III) is a $C_1$-$C_{24}$ alkyl or substituted or unsubstituted $C_6$-$C_{24}$ aryl.

Embodiment 8

The thermal and UV light stabilizing composition according to any one of the preceding embodiments, wherein the hindered hydroxybenzoate compound is selected from the group consisting of 2,4-di-tert-butylphenyl 3,5-di-tert-butyl-4-hydroxybenzoate; hexadecyl 3,5-di-tert-butyl-4-hydroxybenzoate; octadecyl 3,5-di-tert-butyl-4-hydroxybenzoate; octyl 3,5-di-tert-butyl-4-hydroxybenzoate; tetradecyl 3,5-di-tert-butyl-4-hydroxybenzoate, behenylyl 3,5-di-tert-butyl-4-hydroxybenzoate; 2-methyl-4,6-di-tert-butylphenyl 3,5-di-tert-butyl-4-hydroxybenzoate and butyl 3-[3-t-butyl-4-(3,5-di-t-butyl-4-hydroxybenzoyloxy)phenyl]propionate; and mixtures thereof.

Embodiment 9

The thermal and UV light stabilizing composition according to any one of the preceding embodiments, wherein the acid scavenger is selected from the group consisting of zinc oxide, calcium lactate, natural and synthetic hydrotalcites, natural and synthetic hydrocalumites, alkali metal salts and alkaline earth metal salts of higher fatty acids, calcium stearate, zinc stearate, magnesium behenate, magnesium stearate, sodium stearate, sodium ricinoleate and potassium palmitate, antimony pyrocatecholate, zinc pyrocatecholate and mixtures thereof.

Embodiments 10

The thermal and UV light stabilizing composition according to any one of the preceding embodiments, wherein the hindered phenol antioxidant compound comprises a molecular fragment according to one or more of Formula (IVa), (IVb), or (IVc):

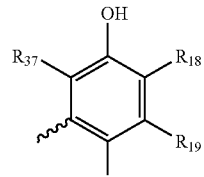

Formula (IVa)

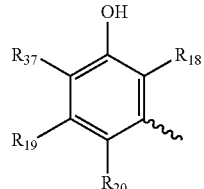

Formula (IVb)

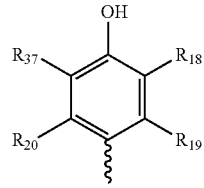

Formula (IVc)

wherein

R$_{18}$ in Formulae (IVa), (IVb) and (IVc) is chosen from hydrogen or a C$_{1-4}$ hydrocarbyl;

each of R$_{19}$ and R$_{20}$ in Formulae (IVa), (IVb) and (IVc) is independently chosen from hydrogen or a C$_1$-C$_{20}$ hydrocarbyl, and R$_{37}$ in Formulae (IVa), (IVb) and (IVc) is chosen from C$_1$-C$_{12}$ hydrocarbyl.

Embodiment 11

The thermal and UV light stabilizing composition according to embodiment 10, wherein R$_{18}$ and R$_{37}$ in Formulae (IVa), (IVb) and (IVc) are chosen from methyl or t-butyl.

Embodiment 12

The thermal and UV light stabilizing composition according to any one of the preceding embodiments, wherein the at least one hindered phenol compound is selected from the group consisting of: (1,3,5-Tris(4-t-butyl-3-hydroxy-2,6-dimethylbenzyl)-1,3,5-triazine-2,4,6-(1H,3H,5H)-trione; 1,3,5-tris(3,5-di-tert-butyl-4-hydroxybenzyl)-1,3,5-triazine-2,4,6(1H,3H,5H)-trione; 1,1,3-Tris(2'-methyl-4'-hydroxy-5'-t-butylphenyl)butane; Triethylene glycol bis[3-(3-t-butyl-4-hydroxy-5-methylphenyl)propionate]; 4,4'-Thiobis(2-t-butyl-5-methylphenol); 2,2'-Thiodiethylene bis[3-(3-t-butyl-4-hydroxyl-5-methylphenyl)propionate], Octadecyl 3-(3'-t-butyl-4'-hydroxy-5'-methylphenyl)propionate; Tetrakismethylene(34-butyl-4-hydroxy-5-methylhydrocinnamate)methane; N,N'-Hexamethylene bis[3-(3-t-butyl-4-hydroxy-5-methylphenyl)propionamide]; Di(4-tertiarybutyl-3-hydroxy-2,6-dimethyl benzyl) thiodipropionate; and octadecyl 3,5-di-(tert)-butyl-4-hydroxyhydrocinnamate; and mixtures thereof.

Embodiment 13

The thermal and UV light stabilizing composition according to any one of the preceding embodiments, wherein the phosphite compound is (i) a hindered arylalkyl phosphite compound according to Formula (V):

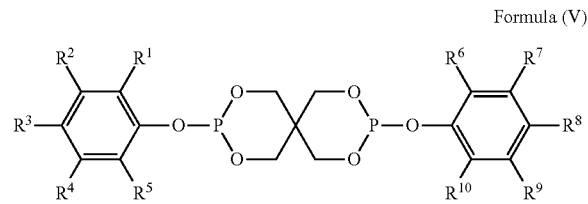

Formula (V)

wherein each of R$^1$, R$^2$, R$^3$, R$^4$, R$^5$, R$^6$, R$^7$, R$^8$, R$^9$, and R$^{10}$ in Formula (V) is independently chosen from hydrogen, C$_1$-C$_{12}$alkyl, C$_3$-C$_{12}$ cycloalkyl, C$_4$-C$_{12}$ alkyl cycloalkyl, C$_6$-C$_{10}$ aryl, or C$_7$-C$_{12}$ alkylaryl, wherein R$^1$ and R$^5$ together comprise at least 5 carbons and at least one of R$^1$ and R$^5$ comprises a tertiary carbon, wherein R$^6$ and R$^{10}$ together comprise at least 5 carbons and at least one of R$^6$ and R$^{10}$ comprises a tertiary carbon; or (ii) a trisarylphosphite according to Formula (VI):

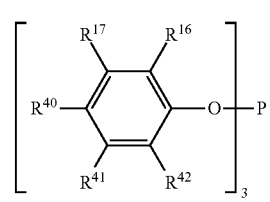

Formula (VI)

wherein each of R$^{16}$, R$^{17}$, R$^{40}$, R$^{41}$, and R$^{42}$ in Formula (VI) is independently chosen from hydrogen, C$_1$-C$_{20}$ alkyl, C$_3$-C$_{20}$ cycloalkyl, C$_4$-C$_{20}$ alkyl cycloalkyl, C$_6$-C$_{10}$ aryl, or C$_7$-C$_{20}$ alkylaryl; or mixtures of Formula (V) and Formula (VI).

Embodiment 14

The thermal and UV light stabilizing composition according to embodiment 13, wherein the hindered arylalkyl phosphite is selected from the group consisting of bis-(2,6-di-t-butyl-4-methiphenyl)pentaerythritol diphosphite, (bis-(2,4-dicumylphenyl)pentaerythritol diphosphite, bis-(2,4-di-t-butyl-phenyl)pentaerythritol diphosphite, and bis-(2,4,6-tri-t-butyl-phenyl)pentaerythritol diphosphite; and mixtures thereof.

Embodiment 15

The thermal and UV light stabilizing composition according to embodiment 13, wherein the trisarylphosphite is selected from the group consisting of tris-(2,4-di-t-butylphenyl)phosphite, tris(4-nonylphenyl) phosphite and triphenyl phosphite; and mixtures thereof.

Embodiment 16

The thermal and UV light stabilizing composition according to any one of embodiments 2-15, wherein the thioester compound is selected from the group consisting of dilauryl thiodipropionate, distearyl thiodipropionate, pentaerythritol tetrakis-(3-dodecylthipropionate), tetra-alkyl thioethyl thiodisuccinate, 2,12-dihydroxy-4,10-dithia-7-oxatridecamethylene bis[3-(dodecylthio)propionate], polyalkanol esters of alkylthio-alkanoic acids, and dialkyl 3,3'-thiodipropionates; and mixtures thereof.

Embodiment 17

The thermal and UV light stabilizing composition according to any one of embodiments 2-16, wherein:

the ortho-hydroxyl tris-aryl-s-triazine compound is 2-[4,6-bis(2,4-dimethylphenyl)-1,3,5-triazin-2-yl]-5-(octyloxy) phenol;

the hindered amine light stabilizer compound is a mixture of fatty acids, and C$_{12}$-C$_{21}$, C$_{18}$ unsaturated 2,2,6,-tetramethyl-4-piperidinyl esters;

the hinderedihydroxybenzoate compound is 3,5-di-tert-butyl-4-hydroxybenzoic acid, hexadecyl ester;

the acid scavenger is selected from the group consisting of magnesium oxide, aluminum oxide, magnesium hydroxide, aluminum hydroxide, carbonates thereof and mixtures thereof;

the phosphite compound is bis(2,4-dicumylphenyl) pentaerythritol diphosphite);

the hindered phenol antioxidant compound is 1,3,5-Tris (4-tert-butyl-3-hydroxy-2,6-dimethyl benzyl)-1,3,5-triazine-2,4,6-(1H,3H,5H)-trione; and the thioester is pentaerythrithol tetrakis-(3-dodecylthiopropionate) or Distearyl thiodipropionate.

Embodiment 18

A composition comprising: a thermal and UV light stabilizing composition according to any one of embodiments 1 to 17; and a material to be stabilized.

Embodiment 19

A composition according to embodiment 18, wherein the material to be stabilized is selected from the group consisting of: polyolefins, polyesters, polyesters, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, potycarbonates, polyketones, aliphatic polyketones, thermoplastic olefins, aminoresin cross-linked polyacrylates and polyesters, polyisocyanate cross-linked polyesters and polyacrylates, phenollformaldehyde, urealformaldehyde and melamine/formaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, radiation curable compositions, epoxymelamine resins, organic dyes, cosmetic products, cellulose-based paper formulations, photographic film paper, fibers, waxes, inks, and blends thereof.

Embodiment 20

The composition according to embodiment 18 or embodiment 19, wherein the material to be stabilized is selected from the group consisting of thermoplastic olefins, acrylonitrile-butadiene-styrene, polyesters, polyvinylchloride, polyamides, polyurethanes, or homo- and copolymers of propylene, isobutylene, butene, methylpentene, hexene, heptene, octene, isoprene, butadiene, hexadiene, dicyclopentadiene, ethylidene cyclopentene and norbornene.

Embodiment 21

The composition according to any one of embodiments 18-20, wherein the material to be stabilized is polypropylene or polyethylene.

Embodiment 22

The composition according to embodiment 18, wherein the material to be stabilized is formed into vinyl siding, vinyl siding trim, a shutter, a gable vent, an cave, fascia, a soffit, a molding, a roofing shingle, a roofing underlayment, a roofing membrane, a batten systems, a batten extender, flashing, a tile pan, a ridge vent, a weather block, a hip and ridge system, an eave riser, a taper strip, a gable end wedge, rake trim, a geomembrane, a composite deck material, a railing or a window frame.

Embodiment 23

The composition according to any one of embodiments 18-21, wherein the composition is a master batch and the thermal and UV light stabilizing composition is present in an amount from about 10 wt. % to about 80 wt. % based on the total weight of the master batch composition, and the material to be stabilized is present in an amount from about 20 wt. % to about 90 wt. % based on the total weight of the master batch composition.

Embodiment 24

The composition according to embodiment 23, wherein the composition is a master batch and the thermal and UV light stabilizing composition is present in an amount from about 30 wt. % to about 60 wt. % based on the total weight of the master batch composition, and the material to be stabilized is present in an amount from about 40 wt. % to about 70 wt. % based on the total weight of the master batch composition.

Embodiment 25

The composition according to any one of embodiments 23-24, wherein the composition is a master batch and the thermal and UV light stabilizing composition is present in an amount between about 40 wt. % to about 50 wt. % based on the total weight of the master batch composition, and the material to be stabilized is present in an amount between about 50 wt. % to about 60 wt. % based on the total weight of the master batch composition.

Embodiment 26

The composition according to any one of embodiments 18-22, wherein the thermal and UV light stabilizing composition is present in an amount from 0.01 wt. % to 5 wt. % based on the total weight of the stabilized composition.

Embodiment 27

The composition according to embodiment 26, wherein the thermal and UV light stabilizing composition is present in an amount from 0.05 wt. % to 2 wt. % based on the total weight of the stabilized composition.

Embodiment 28

The composition according to any one of embodiments 26-27, wherein an amount of the ortho-hydroxyl tris-aryl-s-triazine compound is from about 0.002 wt. % to about 0.50 wt. %, an amount of the hindered amine light stabilizer compound is from about 0.01 wt. % to about 1.20 wt. %, an amount of the hindered hydroxybenzoate compound is from about 0.01 wt. % to about 1.20 wt. %, an amount of the acid scavenger is from about 0.001 wt % to about 0.50 wt. %, an amount of the hindered phenol antioxidant compound is from about 0.001 wt. % to about 0.50 wt. %, and an amount of the phosphite compound is from about 0.005 wt. % to about 1.00 wt. %, based on the total weight of the stabilized composition.

Embodiment 29

The composition according to embodiment 28, wherein the amount of the ortho-hydroxyl tris-aryl-s-triazine compound is from about 0.004 wt. % to about 0.20 wt. %, the amount of the hindered amine light stabilizer compound is from about 0.02 wt. % to about 0.8 wt. %, the amount of the hindered hydroxybenzoate compound is from about 0.02 wt. % to about 0.80 wt. %, the amount of the acid scavenger is from about 0.003 wt. % to about 0.25 wt. %, the amount of the hindered phenol antioxidant compound is from about 0.002 wt. % to about 0.25 wt. %, and the amount of the phosphite composition is from about 0.01 wt. % to about 0.80 wt. %, based on the total weight of the stabilized composition.

Embodiment 30

The composition according to any one of embodiments 26-29, wherein the thermal and UV light stabilizing composition further comprises a thioester compound, wherein an amount of the thioester compound is from about 0.001 wt. % to about 0.80 wt. %, based on the total weight of the stabilized composition.

Embodiment 31

The composition according to embodiment 30, wherein the amount of the thioester compound is from about 0.003 wt. % to about 0.4 wt. %, based on the total weight of the stabilized composition.

Embodiment 32

A process for preparing a composition according to any one of embodiments 18-31, wherein the material to be stabilized is combined with the thermal and UV light stabilizing composition.

Embodiment 33

The process according to embodiment 32, wherein the material to be stabilized is selected from the group consisting of thermoplastic olefins, acrylonitrile-butadiene-styrene, polyesters, polyvinylchloride, polyamides, polyurethanes, or homo- and copolymers of propylene, isobutylene, butene, methylpentene, hexene, heptene, octene, isoprene, butadiene, hexadiene, dicyclopentadiene, ethylidene cyclopentene and norbornene.

Embodiment 34

The process according to embodiment 32 or embodiment 33, wherein the material to be stabilized is polypropylene or polyethylene.

Embodiment 35

The process according to embodiment 32, wherein the material to be stabilized is formed into vinyl siding, vinyl siding trim, a shutter, a gable vent, an eave, fascia, a soffit, a molding, a roofing shingle, a roofing underlayment, a roofing membrane, a batten systems, a batten extender, flashing, a tile pan, a ridge vent, a weather block, a hip and ridge system, an eave riser, a taper strip, a gable end wedge, rake trim, a geomembrane, a composite deck material, a railing or a window frame.

Embodiment 36

A process for improving processability of a material selected from the group consisting of polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins, aminoresin cross-linked polyacrylates and polyesters, polyisocyanate cross-linked polyesters and polyacrylates, phenol/formaldehyde, urea/formaldehyde and melaminelformaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, radiation curable compositions, epoxymelamine resins, organic dyes, cosmetic products, cellulose-based paper formulations, photographic film paper, fibers, waxes, inks, and blends thereof, the process comprising adding a stabilizing amount of a stabilizing composition to the material, the stabilizing composition according to any one of embodiments 1-17.

The compositions disclosed herein may be used in a variety of applications, including, but not limited to automotive applications such as air vents, instrument panels, control consoles, battery house, and exterior parts such as bumpers, side moldings and mirror housings. The compositions may also be used in geomembrane applications such as, for example, pond liners, ground covers, underlayment, water barriers, erosion control membranes, and the like. Other applications that would benefit from thermal and UV stabilization are also contemplated herein.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or flatter to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Examples 1-14

The invention will now be illustrated by the following examples. The examples are not intended to limit the scope of the present invention. In conjunction with the general and detailed descriptions above, the examples provide further understanding of the present invention.

Materials:

Thermoplastic olefin (TPO) number AHXPT053A110GNI101 from Asahi Kasei Corporation is used as base polymer. The various additives (designated A-H) and their wt. % loading are listed in Table 1 below, which will be used henceforth. The additives are used as received.

TABLE 1

| Additive Designation | Additives | Loading (wt %) |
|---|---|---|
| A | CYASORB ® UV 3853 is Fatty acids, $C_{12}$-$C_{21}$, $C_{18}$ unsaturated 2,2,6,6,-tetra-methyl-4-Piperidinyl esters (a hindered amine) (available from Cytec Industries Inc., NJ) | 0.5500 |
| B | CYASORB ® UV 2908 is 3,5-di-tert-butyl-4-hydroxybenzoic acid, hexadecyl ester (a hindered hydroxybenzoate) (available from Cytec Industries Inc., NJ) | 0.1800 |
| C | CYASORB ® UV 1164 is 2-[4,6-bis(2,4-dimethylphenyl)-1,3,5-triazin-2-yl]-5-(octyloxy) phenol (a ortho-hydroxyl tris-aryl-s-triazine compound) (available from Cytec Industries Inc., NJ) | 0.0700 |
| D | DOVERPHOS ® 9228 is bis(2,4-dicumyl-phenyl) pentaerythritol diphosphite from Dover Chemical Corporation (a phosphite) (available from Dover Chemical Corporation) | 0.0548 |
| E | CYANOX ® 1790 is 1,3,5-Tris (4-tert-butyl-3-hydroxy-2,6-dimethyl benzyl)-1,3,5-triazine-2,4,6-(1H,3H,5H)-trione (a hindered phenol Antioxidant) (available from Cytec Industries Inc., NJ) | 0.0328 |
| F | DHT-4A is a mixture of $MgO/Al_2O_3$ (1:4.5) (an Acid scavenger) (available from Kyowa Chemical Industry Co. Ltd.) | 0.0548 |
| G | CYANOX ® STDP is Distearyl thiodipropionate (Stearyl chloride, stearyl alcohol, 3,3'-Thiodipropione acid, distearyl easter) (Thioester) (available from Cytec Industries Inc., NJ) | 0.0548 |
| H | SEENOX 412S is Pentaerythrithol tetrakis-(3-dodecylthiopropionate) (Thioester) (available from Shipro Kasei Kaisha) | 0.0548 |

Melt Mixing of Polymer Additives:

First, the additives are weighed and mixed with polymer pellets. The solid mixture is vigorously shaken to achieve uniform mixing of additives. The solid mixture is then fed into the twin screw extruder hopper. The compounding of additives is performed using a Twin Screw extruder. The conditions during compounding are as follows: rotor speed: 130 rpm; melt temperature: 232° C.; feed rate: 800 rpm; temperature profile range: 171-230° C. The average pressure reading during compounding is 36-40%. Compounded samples are pelletized using a Conair pelletizer. The pellets are air dried for 24 hrs, before further use.

Sample Preparation:

Samples for thermal and weathering tests are prepared using an Arburg injection molder. The conditions during injection molding are as follows: nozzle temperature: 230° C.; injection pressure: 60, shot size: 14.5. For tensile testing, tensile bars according to ASTM638-Type 5 are prepared, Plaques having standard 2×2×0.125 inch dimension are used for both thermal and weathering tests.

Thermal and Weathering Test Conditions:

For thermal performance, samples (Tensile bars and plaques) are kept at 150° C. for a total of 1000 hrs. Samples are analyzed for gloss retention, Delta E, and mechanical strength (stress at break) at 200 hr. intervals. Surface gloss is measured using micro-TRI-Gloss from BYK-Gardner under ASTM Test Procedure D523 with a 60° angle. The gloss retention value is calculated based on unexposed sample. Change in sample color is measured using a Macbeth Color Eye Colorimeter using ASTM D2244-79 with 1" view and D65/10° observer. From the raw data, Delta. E, which is the difference between total color change before and after exposure, is calculated. Lower Delta E indicates less color change respectively, indicating better performance. For tensile strength, five tensile bars for each data point are tested on an Instron Engineering Company Tensile Tester (Model TTB). The average tensile strength of the five test samples are measured using ASTM D638 type-5 method. The cross-head speed of the tensile tester is 2 inch (0.508 cm.) per minute.

For UV weathering, samples are exposed to Xenon Weather-ometer under ASTM-G-155 testing conditions, PV1303, SAEJ1885 (J2412) and SAEJ1960 (J2527). Samples are analyzed for gloss retention and Delta E after set exposure interval.

Thirteen samples with various stabilizer additive combinations are formulated as described above and then tested for extreme thermal performance (tensile strength, gloss and color change) and extreme weathering performance (gloss and color change) against a control sample (no stabilizer composition added). Those samples denoted by a "C" are comparative and represent control samples (i.e., no stabilizing compositions added), or samples containing formulations previously known to those skilled in the art. Example 2C, for example, is based on a formulation described in U.S. Pat. No. 6,843,939. Results of the thermal and weathering tests for the samples as prepared above are presented in Tables 2-5 below.

TABLE 2

Extreme Thermal Performance of Examples 1 to 14: Tensile strength

| Examples | Description of Stabilizer Composition added to Polymer | Tensile Strength 0 hr. | Tensile Strength 1000 hr. | % Retained Tensile Strength 1000 hr. |
|---|---|---|---|---|
| 1C | No stabilizer composition | 4005 | 16 | 0.4 |
| 2C | A + B + C | 4125 | 79 | 1.9 |
| 3C | A + B + C + D | 4162 | 41 | 1.0 |
| 4C | A + B + C + D + E | 4209 | 9 | 0.2 |
| 5 | A + B + C + D + G | 4251 | 79 | 1.9 |
| 6 | A + B + C + D + H | 4318 | 18 | 0.4 |
| 7 | A + B + C + D + F | 4424 | 23 | 0.5 |
| 8 | A + B + C + D + E + H | 4204 | 309 | 7.3 |
| 9 | A + B + C + D + E + G | 4277 | 175 | 4.1 |
| 10 | A + B + C + D + E + F | 4273 | 369 | 8.6 |
| 11 | A + B + C + D + F + G | 4247 | 249 | 5.9 |
| 12 | A + B + C + D + F + H | 4391 | 113 | 2.6 |
| 13 | A + B + C + D + E + F + G | 4282 | 1519 | 35.5 |
| 14 | A + B + C + D + E + F + H | 4249 | 3330 | 78.4 |

Examples 1C-4C performed poorly with regard to retaining tensile strength under extreme thermal conditions as compared to certain compositions according to the invention as described herein (e.g., Examples 5-14).

TABLE 3

Extreme Thermal Performance of Examples 1 to 14:
Percentage Gloss Retention and Total Color Change

| Examples | Description of Stabilizer Composition added to Polymer | % Gloss Retention (60°) 1200 hr. | Total Color Change (ΔE) 1200 hr. |
|---|---|---|---|
| 1C | No stabilizer composition | 15 | 47.1 |
| 2C | A + B + C | 16 | 46.8 |
| 3C | A + B + C + D | 7 | 47.2 |
| 4C | A + B + C + D + E | 17 | 46.9 |
| 5 | A + B + C + D + G | 22 | 46.7 |
| 6 | A + B + C + D + H | 23 | 49.8 |
| 7 | A + B + C + D + F | 15 | 47.7 |
| 8 | A + B + C + D + E + H | 25 | 35.3 |
| 9 | A + B + C + D + E + G | 44 | 26.2 |
| 10 | A + B + C + D + E + F | 34 | 50.0 |
| 11 | A + B + C + D + F + G | 23 | 24.6 |
| 12 | A + B + C + D + F + H | 19 | 46.5 |
| 13 | A + B + C + D + E + F + G | 69 | 15.0 |
| 14 | A + B + C + D + E + F + H | 65 | 13.8 |

Figure 1B:
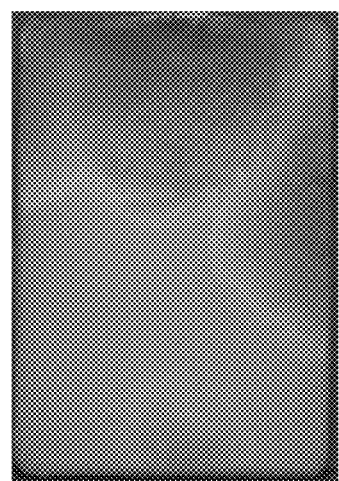
Figure 1C:
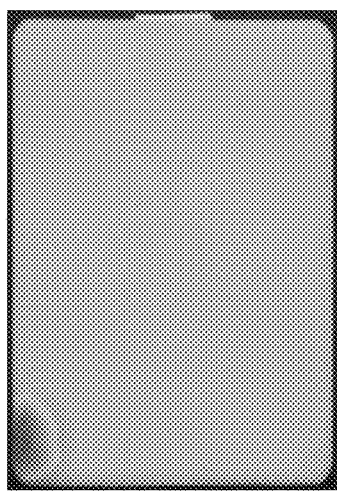
Figure 1D:
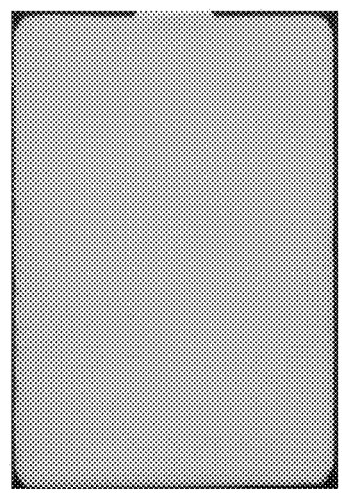
Figure 1E:
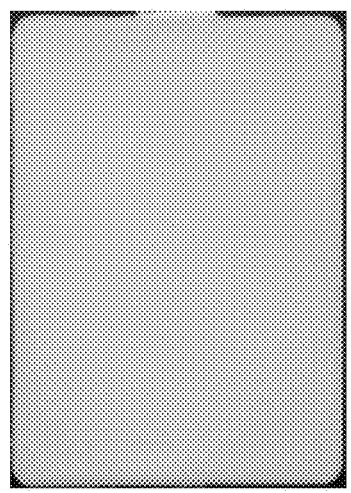

Compositions according to the invention as described herein (e.g., Examples 13 and 14) provide the best extreme thermal performance in terms of highest gloss retention and lowest color change as compared to control samples and samples containing formulations known to those skilled in the art (i.e., Examples 1C-4C). This result is also visually demonstrated by FIGS. 1A-1E. Plaques with no stabilizer composition (FIG. 1A) or with stabilizer composition based on U.S. Pat. No. 6,843,939 (FIG. 1B) show blooming under extreme thermal conditions, whereas plaques with stabilizing compositions according to the invention as described herein (FIGS. 1C, 1D, and 1E) show significantly less, or no blooming under the same conditions.

TABLE 4

Extreme Thermal Performance of examples
1 to 14 Percentage Gloss Retention

| Examples | Description of Stabilizer Composition added to Polymer | % Gloss Retention | | |
|---|---|---|---|---|
| | | Interior 2500 kJ | Exterior 2500 kJ | PV1303 10th Cycle |
| 1C | No stabilizer composition | Surface crack | surface crack | 0 |
| 2C | A + B + C | 95 | 89 | 93 |
| 3C | A + B + C + D | 98 | 92 | 92 |
| 4C | A + B + C + D + E | 99 | 89 | 94 |
| 5 | A + B + C + D + G | 99 | 90 | 96 |
| 6 | A + B + C + D + H | 100 | 91 | 94 |
| 7 | A + B + C + D + F | 100 | 91 | 94 |
| 8 | A + B + C + D + E + H | 101 | 89 | 92 |
| 9 | A + B + C + D + E + G | 100 | 95 | 95 |
| 10 | A + B + C + D + E + F | 100 | 92 | 90 |
| 11 | A + B + C + D + F + G | 100 | 90 | 94 |
| 12 | A + B + C + D + F + H | 99 | 91 | 94 |
| 13 | A + B + C + D + E + F + G | 99 | 94 | 93 |
| 14 | A + B + C + D + E + F + H | 98 | 95 | 94 |

Compositions according to the invention as described herein (e.g., Examples 10, 13, and 14) do not adversely affect the good weathering performance in terms of highest gloss retention when compared to control samples and samples containing formulations known to those skilled in the art (i.e., Examples 1C-4C).

TABLE 5

Extreme Weathering Performance of Examples
1 to 14: Total Color Change (Delta E)

| Examples | Description of Stabilizer Composition added to Polymer | Total Color Change (ΔE) | | |
|---|---|---|---|---|
| | | Interior 2500 kJ | Exterior 2500 kJ | PV1303 10th Cycle |
| 1C | No stabilizer composition | Surface Crack | Surface crack | 13.7 |
| 2C | A + B + C | 5.6 | 1.9 | 3.8 |
| 3C | A + B + C + D | 5.7 | 1.8 | 4.0 |
| 4C | A + B + C + D + E | 5.9 | 1.8 | 4.3 |
| 5 | A + B + C + D + G | 6.4 | 1.8 | 4.6 |
| 6 | A + B + C + D + H | 6.4 | 1.7 | 4.7 |
| 7 | A + B + C + D + F | 6.5 | 2.0 | 4.8 |
| 8 | A + B + C + D + E + H | 6.2 | 1.8 | 4.4 |
| 9 | A + B + C + D + E + G | 5.7 | 1.6 | 4.4 |
| 10 | A + B + C + D + E + F | 6.1 | 1.9 | 4.2 |
| 11 | A + B + C + D + F + G | 6.5 | 1.9 | 4.6 |
| 12 | A + B + C + D + F + H | 6.5 | 1.9 | 4.9 |
| 13 | A + B + C + D + E + F + G | 5.7 | 1.7 | 4.0 |
| 14 | A + B + C + D + E + F + H | 5.9 | 1.7 | 4.0 |

Compositions according to the invention as described herein (e.g., Examples 10, 13, and 14) do not adversely affect the good weathering performance in terms of lowest color change when compared to control samples and samples containing formulations known to those skilled in the art (i.e., Examples 1C-4C).

Thus, based on the results above, it is surprisingly shown that compositions according to the invention as described herein not only display a synergistic effect and provide enhanced thermal performance in terms of retaining tensile strength under extreme conditions as compared to control samples and samples containing formulations known to those skilled in the art, but the compositions according to the invention as described herein also do not have any antagonistic effect against the good weathering performance demonstrated by samples containing formulations known to those skilled in the art.

Examples 15-19: Multipass Processing Stabilization Study

In Examples 15-19, the additives listed in Table 1 are utilized to conduct a multipass processing stabilization study.

Melt Mixing of Polymer Additives:

First, the additives are weighed and mixed with polypropylene (Profax 6301) resin. The solid mixture is vigorously shaken to achieve uniform mixing of additives. The solid mixture is fed into the single screw extruder hopper. The compounding of additives is performed using a single screw extruder. The conditions during compounding are as follows: rotor speed: 100 rpm; melt temperature: 230° C.; feed rate: 70-100 rpm; temperature profile range: 215-230° C. The average pressure reading during compounding is 36-40%. Compounded samples are pelletized using a Conair pelletizer.

Multipass Extrusion Processing:

The pellets are passed through the single screw extruder five times and about 200 g of sample are collected from the first, third, and fifth passes. To determine the processing characteristics, the relative melt flow of the compounded polypropylene pellets are measured using the Dynisco Melt Flow indexer (MFI). This procedure is specific for ASTM D1238 Method B-Automatically Timed Flow Rate Measurement. A lower Melt flow rate (MFR-g/10 min) indicates higher viscosity properties, demonstrating better stability performance of the polymer. The results are shown in Table 6 below as well as in a graph presented in FIG. 2.

TABLE 6

Processing stabilization performance: Melt Flow Index (g/10 min)

| | | Melt Flow Index (g/10 min) | | |
|---|---|---|---|---|
| Examples | Description | Pass 1 | Pass 3 | Pass 5 |
| 15C | No stabilizer composition | 16.90 | 22.08 | 26.21 |
| 16C | A + B + C | 16.27 | 19.93 | 23.45 |
| 17 | A + B + C + D + E + F | 14.91 | 14.66 | 15.62 |
| 18 | A + B + C + D + E + F + G | 14.20 | 13.74 | 14.29 |
| 19 | A + B + C + D + E + F + H | 13.96 | 13.71 | 14.33 |

Figure 2:
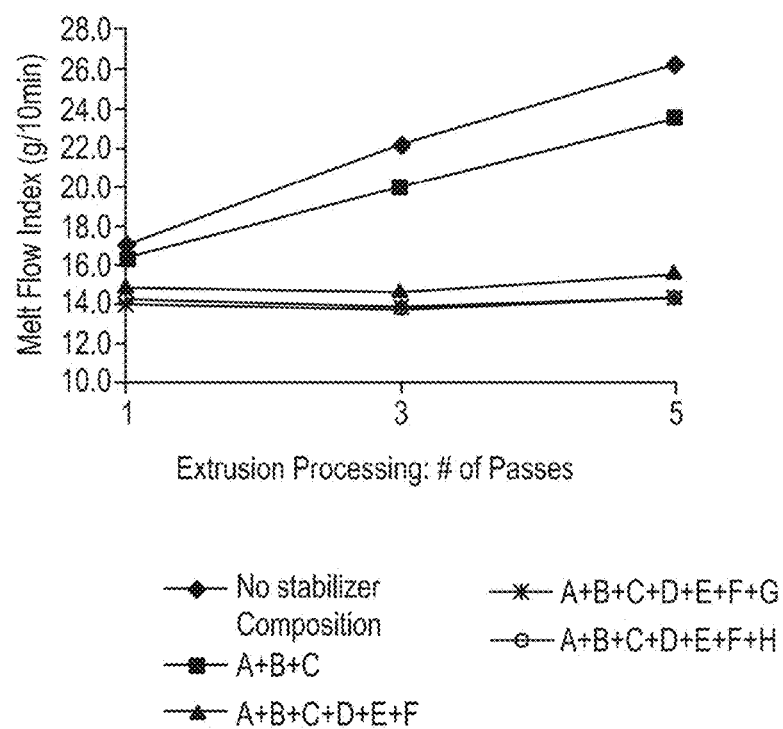
FIG. 2 is a graph illustrating the results of Examples 15-19.

As shown in Table 6 and in the graph of FIG. 2, compositions according to the invention as described herein (Examples 17, 18 and 19) have improved processability, i.e., remain stabilized and maintain low melt flow rates, as compared to other compositions.

What is claimed is:

1. A process for producing a stabilized molded article, said process comprising:
combining a stabilizing amount of a thermal and ultraviolet (UV) light stabilizer composition with a polymeric material subject to degradation induced by light, heat or oxidation to form a stabilized polymeric material; and
forming the stabilized polymeric material into a molded article,
wherein the stabilizer composition comprises an ortho-hydroxyl tris-aryl-s-triazine compound; a hindered amine light stabilizer compound; a hindered hydroxybenzoate compound; an acid scavenger; a phosphite compound; a hindered phenol antioxidant compound; and a thioester compound.

2. The process according to claim 1, wherein the polymeric material subject to degradation induced by light, heat or oxidation is selected from the group consisting of polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins, aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, and epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, radiation curable compositions, epoxymelamine resins, organic dyes, cosmetic products, cellulose-based paper formulations, photographic film paper, fibers, waxes, inks, and blends thereof.

3. The process according to claim 2, wherein the polymeric material is selected from the group consisting of thermoplastic olefins, acrylonitrile-butadiene-styrene, polyesters, polyvinylchloride, polyamides, polyurethanes, or homo- and copolymers of propylene, isobutylene, butene, methylpentene, hexene, heptene, octene, isoprene, butadiene, hexadiene, dicyclopentadiene, ethylidene cyclopentene and norbornene.

4. The process according to claim 3, wherein the polymeric material to be stabilized is polyethylene or polypropylene.

5. The process according to claim 1 or claim 3, wherein:
(a) the ortho-hydroxyl tris-aryl-s-triazine compound is a 2-(2'-hydroxyphenyl)-1,3,5-triazine compound according to Formula (I):

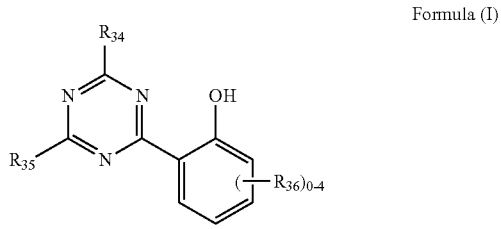

Formula (I)

wherein
each of $R_{34}$ and $R_{35}$ in Formula (I) is independently chosen from $C_6$-$C_{10}$ aryl optionally substituted, $C_{10}$ hydrocarbyl-substituted amino, $C_{10}$ acyl or $C_{10}$ alkoxyl; and $R_{36}$ in Formula (I) is present at from 0 to 4 positions of the phenoxy portion of Formula I and in each instance is independently chosen from hydroxyl, $C_1$-$C_{12}$ hydrocarbyl, $C_1$-$C_{12}$ alkoxyl, $C_1$-$C_{12}$ alkoxyester, or $C_1$-$C_{12}$ acyl, (b) the hindered amine light stabilizer compound comprises a molecular fragment according to Formula (II):

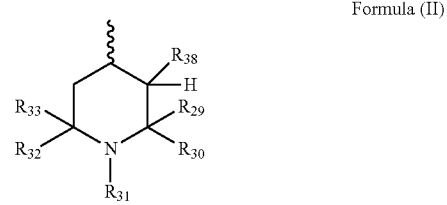

Formula (II)

wherein
$R_{31}$ in Formula (II) is chosen from: hydrogen; OH; $C_1$-$C_{20}$ hydrocarbyl; —$CH_2CN$; $C_1$-$C_{12}$ acyl; or $C_1$-$C_{18}$ alkoxy;
$R_{38}$ in Formula (II) is chosen from: hydrogen; or $C_1$-$C_8$ hydrocarbyl; and
each of $R_{29}$, $R_{30}$, $R_{32}$, and $R_{33}$ in Formula (II) is independently chosen from $C_1$-$C_{20}$ hydrocarbyl, or $R_{29}$ and $R_{30}$ and/or $R_{32}$ and $R_{33}$ in Formula (II) taken together with the carbon to which they are attached form a $C_5$-$C_{10}$ cycloalkyl; or according to Formula (IIa)

Formula (IIa)

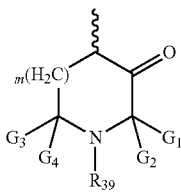

wherein
m in Formula (IIa) is an integer from 1 to 2;
$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and
each of $G_1$-$G_4$ in Formula (IIa) is independently chosen from $C_1$-$C_{20}$ hydrocarbyl, (c) the hindered hydroxybenzoate compound is according to Formula (III):

Formula (III)

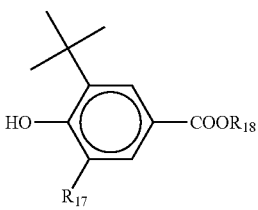

wherein
$R_{17}$ in Formula (III) is a $C_1$-$C_8$ alkyl and $R_{18}$ in Formula (III) is a $C_1$-$C_{24}$ alkyl or substituted or unsubstituted $C_6$-$C_{24}$ aryl, (d) the acid scavenger is selected from the group consisting of zinc oxide, calcium lactate, natural and synthetic hydrotalcites, natural and synthetic hydrocalumites, alkali metal salts and alkaline earth metal salts of higher fatty acids, calcium stearate, zinc stearate, magnesium behenate, magnesium stearate, sodium stearate, sodium ricinoleate and potassium palmitate, antimony pyrocatecholate, zinc pyrocatecholate; and mixtures thereof, (e) the hindered phenol antioxidant compound comprises a molecular fragment according to one or more of Formula (IVa), (IVb), or (IVc):

Formula (IVa)

Formula (IVb)

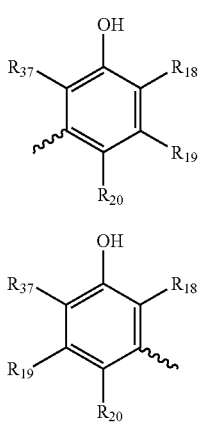

Formula (IVc)

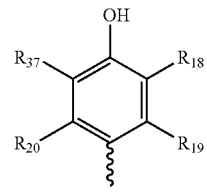

wherein
$R_{18}$ in Formulae (IVa), (IVb) and (IVc) is chosen from hydrogen or a $C_{1-4}$ hydrocarbyl;
each of $R_{19}$ and $R_{20}$ in Formulae (IVa), (IVb) and (IVc) is individually chosen from hydrogen or a $C_1$-$C_{20}$ hydrocarbyl; and
$R_{37}$ in Formulae (IVa), (IVb) and (IVc) is chosen from $C_1$-$C_{12}$ hydrocarbyl, and (f) the phosphite compound is chosen from a hindered arylalkyl phosphite compound according to Formula (V):

Formula (V)

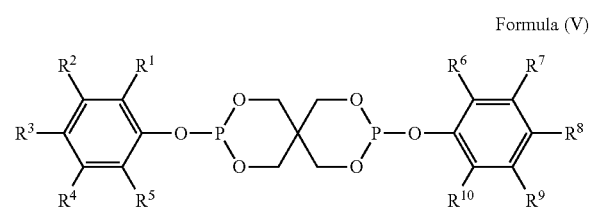

wherein
each of $R^1$, $R^2$, $R^3$, $R^4$, $R^5$, $R^6$, $R^7$, $R^8$, $R^9$, and $R^{10}$ in Formula (V) is individually chosen from hydrogen, $C_1$-$C_{12}$ alkyl, $C_3$-$C_{12}$ cycloalkyl, $C_4$-$C_{12}$ alkyl cycloalkyl, $C_6$-$C_{10}$ aryl, or $C_7$-$C_{12}$ alkylaryl,
$R^1$ and $R^5$ together comprise at least 5 carbons and at least one of $R^1$ and $R^5$ comprises a tertiary carbon,
$R^6$ and $R^{10}$ together comprise at least 5 carbons and at least one of $R^6$ and $R^{10}$ comprises a tertiary carbon; or
a trisarylphosphite according to Formula (VI):

Formula (VI)

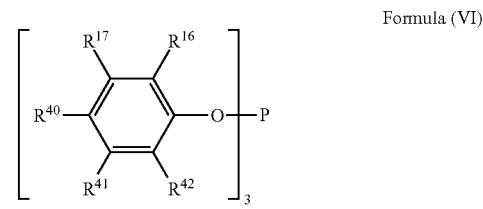

wherein
each of $R^{16}$, $R^{17}$, $R^{40}$, $R^{41}$, and $R^{42}$ in Formula (VI) is individually chosen from hydrogen, $C_1$-$C_{20}$ alkyl, $C_3$-$C_{20}$ cycloalkyl, $C_4$-$C_{20}$ alkyl cycloalkyl, $C_6$-$C_{10}$ aryl, or $C_7$-$C_{20}$ alkylaryl; or
mixtures of Formula (V) and Formula (VI); and (g) the thioester compound is selected from the group consisting of dilauryl thiodipropionate, distearyl thiodipropionate, pentaerythrithol tetrakis-(3-dodecylthiopropionate), tetra-alkyl thioethyl thiodisuccinate, 2,12-dihydroxy-4,10-dithia-7-oxatridecamethylene bis[3-(dodecylthio)propionate], polyalkanol esters of alkylthio-alkanoic acids, and dialkyl 3,3'-thiodipropionates; and mixtures thereof.

6. The process according to claim 5, wherein the 2-(2'-hydroxyphenyl)-1,3,5-triazine compound is selected from the group consisting of: 4,6-bis-(2,4-dimethylphenyl)-2-(2-hydroxy-4-octyloxyphenyl)-s-triazine; 4,6-bis-(2,4-dimethylphenyl)-2-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxy-ethoxy)phenyl]-6-(4-chlorophenyl)-s-triazine; 2,4-bis[2-hydroxy-4-(2-hydroxy-4-(2-hydroxy-ethoxy)phenyl]-6-(2,4-dimethylphenyl)-s-triazine; 2,4-bis [2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chlorophenyl)-s-triazine; 2,4-bis(2,4-dihydroxyphenyl)-6-(2,4-dimethylphenyl)-s-triazine; 2,4-bis(4-biphenylyl)-6-[2-hydroxy-4-[(octyloxycarbonyl)ethylideneoxy]phenyl]-s-triazine; 2,4-bis(4-biphenylyl)-6-[2-hydroxy-4-(2-ethylhexyloxy)phenyl]-s-triazine; 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine; 2,4-bis(2,4-dimethylphenyl)-6-[2-hydroxy4(-3-benzyloxy-2-hydroxypropyloxy)phenyl]-s-triazine; 2,4-bis(2-hydroxy-4-n-butyloxyphenyl)-6-(2,4-di-n-butyloxyphenyl)-s-triazine; 2,4-bis(2,4-dimethylphenyl)-6-[2-hydroxy-4-(3-nonyloxy-2-hydroxypropylox-y)-5-α-cumylphenyl]-s-triazine; methylenebis-{2,4-bis(2,4-dimethylphenyl)-6-[2-hydroxy-4-(3-butyloxy-2-hydroxypropoxy)phenyl]-s-triazine}; methylene bridged dimer mixture bridged in the 3:5', 5:5' and 3:3' positions in a 5:4:1 ratio; 2,4,6-tris(2-hydroxy-4-isooctyloxycarbonyliso-propylideneoxy-phenyl)-s-triazine; 2,4-bis (2,4-dimethylphenyl)-6-(2-hydroxy-4-hexyloxy-5-α-cumylphenyl)-s-triazine; 2-(2,4,6-trimethylphenyl)-4,6-bis[2-hydroxy-4-(3-butyloxy-2-hydroxypropyloxy)phenyl]-s-triazine; 2,4,6-tris[2-hydroxy-4-(3-sec-butyloxy-2-hydroxypropyloxy)-phenyl]-s-triazine; mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine; 4,6-bis-(2,4-dimethylphenyl)-2-(2-hydroxy-4(3-(2-ethylhexyloxy)-2-hydroxypropoxy)-phenyl)-s-triazine; 4,6-diphenyl-2-(4-hexyloxy-2-hydroxyphenyl)-s-triazine; 2-(4,6-Diphenyl-1,3,5-triazin-2-yl)-5-[2-(2-ethylhexanoyloxy)ethoxy]phenol; 2,4,6-tris(2-hydroxy-4-octyloxyphenyl)-1,3,5-triazine; propanoic acid, 2,2',2"-[1,3,5-triazine-2,4,6-triyltris[(3-hydroxy-4,1-phenylene)oxy]]tris-1,1',1"-trioctyl ester; propanoic acid, 2-[4-[4,6-bis([1,1'-biphenyl]-4-yl)-1,3,5-triazin-2yl]-3-hydroxyphenoxyl]-isooctyl ester; and mixtures thereof.

7. The process according to claim 5, wherein the hindered amine light stabilizer is selected from the group consisting of: bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of N,N'-bis(2,2,6,6-tetramethylpiperidin-4-yl)hexamethylenediamine and 4-morpholino-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis (1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol, 1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl)pyrrolidine-2,5-dione; 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyltris[(cyclohexylimino)-2,1-ethanediyl]]tris[3,3,5,5-tetramethyl-; piperazinone, 1,1',1"-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis (hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl) pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; 8-acetyl-3-dodecyl-7,7,9,9-tetramethyl-1,3,8-triazaspiro [4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl)3,3-pentamethylene-5,5-dimethylpiperazin-2-one; $N^1$-tert-octyl-3,3,5,5-tetramethyl-diazepin-2-one; $N^1$-tert-octyl-3,3-pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); $N^1$-isopropyl-1,4-diazadispiro-(3,3,5,5)pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; $N^1$-octyl-1,4-diazadispiro-(3,3,5,5) pentamethylene-1,5-diazepin-2-one; and mixtures thereof.

8. The process according to claim 5, wherein the hindered hydroxybenzoate compound is selected from the group consisting of 2,4-di-tert-butylphenyl 3,5-di-tert-butyl-4-hydroxybenzoate; hexadecyl 3,5-di-tert-butyl-4-hydroxybenzoate; octadecyl 3,5-di-tert-butyl-4-hydroxybenzoate; octyl 3,5-di-tert-butyl-4-hydroxybenzoate; tetradecyl 3,5-di-tert-butyl-4-hydroxybenzoate; behenylyl 3,5-di-tert-butyl-4-hydroxybenzoate; 2-methyl-4,6-di-tert-butylphenyl 3,5-di-tert-butyl-4-hydroxybenzoate and butyl 3-[3-t-butyl-4-(3,5-di-t-butyl-4-hydroxybenzoyloxy)phenyl]propionate; and mixtures thereof.

9. The process according to claim 5, wherein the at least one hindered phenol compound is selected from the group consisting of: (1,3,5-Tris(4-t-butyl-3-hydroxy-2,6-dimethylbenzyl)-1,3,5-triazine-2,4,6-(1H,3H,5H)-trione; 1,3,5-tris(3,5-di-tert-butyl-4-hydroxybenzyl)-1,3,5-triazine-2,4,6(1H,3H,5H)-trione; 1,1,3-Tris(2'-methyl-4'-hydroxy-5'-t-butylphenyl)butane; Triethylene glycol bis[3-(3-t-butyl-4-hydroxy-5-methylphenyl)propionate]; 4,4'-Thiobis(2-t-butyl-5-methylphenol); 2,2'-Thiodiethylene bis[3-(3-t-butyl-4-hydroxyl-5-methylphenyl)propionate]; Octadecyl 3-(3'-t-butyl-4'-hydroxy-5'-methylphenyl)propionate; Tetrakismethylene(3-t-butyl-4-hydroxy-5-methylhydrocinnamate)methane; N,N'-Hexamethylene bis[3-(3-t-butyl-4-hydroxy-5-methylphenyl)propionamide]; Di(4-tertiarybutyl-3- hydroxy-2,6-dimethyl benzyl) thiodipropionate; and octadecyl 3,5-di-(tert)-butyl-4-hydroxyhydrocinnamate; and mixtures thereof.

10. The process according to claim 5, wherein the hindered arylalkyl phosphite is selected from the group consisting of bis-(2,6-di-t-butyl-4-methlphenyl)pentaerythritol diphosphite, (bis-(2,4-dicumylphenyl)pentaerythritol diphosphite, bis-(2,4-di-t-butyl-phenyl)pentaerythritol diphosphite, and bis-(2,4,6-tri-t-butyl-phenyl)pentaerythritol diphosphite; and mixtures thereof.

11. The process according to claim 5, wherein the trisarylphosphite is selected from the group consisting of tris-(2,4-di-t-butylphenyl)phosphite, tris(4-nonylphenyl) phosphite, triphenyl phosphite; and mixtures thereof.

12. The process according to claim 5, wherein:
the ortho-hydroxyl tris-aryl-s-triazine compound is 2-[4,6-bis(2,4-dimethylphenyl)-1,3,5-triazin-2-yl]-5-(octyloxy) phenol;
the hindered amine light stabilizer compound is a mixture of fatty acids, and $C_{12}$-$C_{21}$, $C_{18}$ unsaturated 2,2,6,6,-tetramethyl-4-piperidinyl esters;
the hindered hydroxybenzoate compound is 3,5-di-tert-butyl-4-hydroxybenzoic acid, hexadecyl ester;
the acid scavenger is selected from the group consisting of magnesium oxide, aluminum oxide, magnesium hydroxide, aluminum hydroxide, carbonates thereof and mixtures thereof;
the phosphite compound is bis(2,4-dicumylphenyl) pentaerythritol diphosphite);
the hindered phenol antioxidant compound is 1,3,5-Tris (4-tert-butyl-3-hydroxy-2,6-dimethyl benzyl)-1,3,5-triazine-2,4,6-(1H,3H,5H)-trione; and
the thioester is pentaerythrithol tetrakis-(3-dodecylthiopropionate) or Distearyl thiodipropionate.

13. The process according to claim 1, wherein the stabilized molded article is selected from the group consisting of vinyl siding, vinyl siding trim, a shutter, a gable vent, an eave, fascia, a soffit, a molding, a roofing shingle, a roofing underlayment, a roofing membrane, a batten system, a batten extender, flashing, a tile pan, a ridge vent, a weather block, a hip and ridge system, an eave riser, a taper strip, a gable end wedge, rake trim, a geomembrane, a composite deck material, a railing and a window frame.

14. The process according to claim 1, wherein the thermal and UV light stabilizing composition is present in an amount from 0.01 wt. % to 5 wt. % based on a total weight of the polymeric material to be stabilized.

15. The process according to claim 14, wherein the thermal and UV light stabilizing composition is present in an amount from 0.05 wt. % to 2 wt. % based on a total weight of the polymeric material to be stabilized.

16. The process according to claim 6, wherein the stabilized molded article is selected from the group consisting of vinyl siding, vinyl siding trim, a shutter, a gable vent, an eave, fascia, a soffit, a molding, a roofing shingle, a roofing underlayment, a roofing membrane, a batten system, a batten extender, flashing, a tile pan, a ridge vent, a weather block, a hip and ridge system, an eave riser, a taper strip, a gable end wedge, rake trim, a geomembrane, a composite deck material, a railing and a window frame.

17. The process according to claim 6, wherein the thermal and UV light stabilizing composition is present in an amount from 0.01 wt. % to 5 wt. % based on a total weight of the polymeric material to be stabilized.

18. The process according to claim 17, wherein the thermal and UV light stabilizing composition is present in an amount from 0.05 wt. % to 2 wt. % based on a total weight of the polymeric material to be stabilized.

* * * * *